United States Patent [19]

Berg et al.

[11] 3,823,401

[45] July 9, 1974

[54] SYNCHRONOUS DATA TRANSMISSION NETWORK

[75] Inventors: Edward A. Berg, Vienna; Frank T. Chen, Merryfield Village, both of Va.

[73] Assignee: Data Transmission Company, Vienna, Va.

[22] Filed: Oct. 4, 1972

[21] Appl. No.: 294,839

[52] U.S. Cl. ........... 343/204, 179/15 A, 179/15 AT

[51] Int. Cl. ............................................. H04j 3/00

[58] Field of Search ............................ 343/200–204; 179/15 BD, 15 AD, 15 A, 15 AW, 15 AT; 325/14 X

[56] References Cited

UNITED STATES PATENTS

| | | | |
|---|---|---|---|
| 2,471,416 | 5/1949 | Deloraine et al. | 179/15 BD |
| 2,509,218 | 5/1950 | Deloraine | 343/200 X |
| 2,626,348 | 1/1953 | Nobles | 325/14 X |
| 3,209,260 | 9/1965 | Young, Jr. | 343/200 |
| 3,399,278 | 8/1968 | Dahlman | 343/204 |
| 3,471,646 | 10/1969 | Magnuski et al. | 343/204 |
| 3,532,988 | 10/1970 | Magnuski | 343/204 |
| 3,639,693 | 2/1972 | Bartlett et al. | 179/15 A |

*Primary Examiner*—Benedict V. Safourek
*Assistant Examiner*—Jin F. Ng
*Attorney, Agent, or Firm*—LeBlanc & Shur

[57] ABSTRACT

Disclosed is a common carrier type network for the high speed transmission of digital data. Data channels are multiplexed for transmission over a microwave backbone trunk in a synchronous manner and subscriber interconnection is effected at an intermediate multiplex level by a time division switch matrix. Full duplex transmission is by way of two digitally modulated microwave carriers.

29 Claims, 17 Drawing Figures

SYNCHRONOUS DATA TRANSMISSION NETWORK

This application is related to assignee's copending Application Ser. No. 88,068 filed Nov. 9, 1970 for DATA TRANSMISSION NETWORK.

This invention is directed to a common carrier type network for the high speed transmission of digital data and more particularly to a synchronous data transmission network incorporating time division switching (TDS). The invention is directed to a nationwide digital communications network system specifically designed and engineered for the rapid transmission of data. In the preferred embodiment, the network comprises three elements, namely a backbone or main trunking system, a switching system for controlling operation, and a local distribution system. These elements are integrated into an end-to-end data communication system specifically designed for the rapid transmission of digital data all the way through the system from one subscriber or customer to another.

Within the past decade, major advances in data processing technology have focused attention on the entire spectrum of data transmission services. The development of the first viable computer/ communications interfaces in the late 1950's and early 1960's fostered a series of pioneering data communications applications such as message switching, airline reservations, and command and control systems. In 1960, about 8,000 data terminals had been installed — most of these were standard keyboard/teleprinter devices. During the past ten years, the number of data terminals has swelled to over 150,000, including such varied types of terminals as cathode ray tubes (CRTs), remote entry devices, digital and graphic plotters, optical/mark scanners, magnetic tape units and a host of special purpose devices. Using these terminals, data communications applications now include order processing, inventory management, time sharing, information retrieval, and other mainstream business, government and institutional systems.

Major economic and social pressures are spurring users to seek faster, less costly, and more accurate ways of trasporting data. Most businesses are faced with rapidly rising costs, shrinking profit margins, deteriorating customer service, and growing domestic and international competition. The federal government, state and local governments and private institutions are striving to raise socio-economic standards, control the environment, advance scientific and defense efforts, and speed legislative and administrative processes.

In all of these endeavors, the need for access to large amounts of data has been accentuated by the computer's ability to put such data to effective use. The desire and need to increase the scope and magnitude of data communications systems to make this data processing capability more widely available is intensifying rapidly in most organizations.

Through improved data transmission, a consumer of the products and services of industry, finance, government, not-for-profit organization, and educational and other institutions can enjoy the benefits of faster, lower cost and more accurate flows of information. Examples of specific benefits include: faster medical diagnosis and other services, greater responsiveness to information inquiries, more efficient use of credit, faster settlement of insurance claims, advent of the "checkless" and "certificateless" society, lower cost, more up-to-date publications, improved product design, more comprehesive reservation systems for transportation, lodging and entertainment, more rapid processing and execution of orders for consumers, contractors and investors, faster delivery and more efficient distribution of goods and services. In addition, many current development activities are focused on making computer-related services directly accessible to individuals. The ultimate impact of these developments will be to bring the benefits of the computer inside the home through data transmission. Some of the more practical applications include computer-assisted instruction, remote order entry and catalog buying, real-time opinion sampling, voting, and census taking, computational assistance, personal financial counseling, and direct banking services.

Impressive advances in computer-related technology have been realized in recent years. These include powerful computing and peripheral equipment, such as expanded memories, larger disks, optional scanners, and multiprocessors, low-cost data terminals and portable data recorders such as CRT's, digital plotters, remote job entry devices, mini-computers, tape cassettes, facsimilie units, and many others. Additional developments include packaged software such as compilers, time-sharing logic, applications, compatibility, and new services such as time-sharing, information utilities, data banks, and specialized applications. Despite these advances, the application of many of them to the public interest has been inhibited by the lack of availability of suitable economical data transmission facilities.

A principal reason for the failure to make optimum use of computer capabilities by way of efficient data transmission is due to the fact that digital data is uniquely different from the voice and personal message traffic for which the present analog common carrier facilities were designed. The present analog systems have grown over the years from simple beginnings involving few of the present requirements of the nationwide data communications market. In attempting to meet new demands, these systems have been modified again and again, always with the requirement that compatibility with the analog transmission of voice signals was of prime importance. Ingenious but complicated arrangements have been developed to permit transmission of more information over each analog circuit. For the most part these techniques have relied upon frequency selective means exclusively, which have been combined into the frequency division multiplexing (FDM) systems now used by most communications carriers.

Because of inherent design limitations involving relatively expensive filters and other components, the limitations of these FDM systems have become more apparent over the past three decades. In recent years, however, large scale digital data handling and computer systems have come into widespread use, adding a new and large dimension to communications market demand. Today a digital computer terminal must of necessity utilize the facilities of the common carrier analog communications systems; systems whose transmission characteristics are dissimilar from the data to be transmitted.

Accordingly, signal conversion equipment — modulator-demodulators (MODEMS) — has been made available both by the common carriers and independent manufacturers to convert digital signals for analog transmission. This equipment is inherently complex, even for use in low speed data transmission. But for transmission at high bit rates, such equipment can become prohibitively expensive. The requirements for MODEMS in the current analog networks creates discontinuity in the transmitted signal which is generally considered a major impediment to the efficient transmission of digital information. In short, data transmission by means of an end-to-end digital system has become not only attractive but essential to effective and efficient data communications. The present invention is directed to a digital transmission network which meets the needs of the data communications market with the same basic effectiveness with which the present analog systems have met the demands of the communications markets for which they were designed.

In order to overcome these and other difficulties, there is disclosed in assignee's copending Application Ser. No. 88,068 filed Nov. 9, 1970 for DATA TRANSMISSION NETWORK, the disclosure of which is incorporated herein by reference, a common carrier type system specifically designed for high speed data transmission and structured to serve the national data communications market taking advantage of the economies of scale which results. The system traverses the United States with a high channel density microwave backbone trunk following a route between San Francisco, Los Angeles, Dallas, Minneapolis, St. Paul, Atlanta and Boston. Spur routes from the backbone trunk provides service to additional cities and are planned to accommodate growth in demand for service.

The system of that application is designed to include service characteristics responsive to the expressed demands of the present data communication market, as well as in anticipation of requirements for this market's future. These characteristics include high reliability, rapid connection, ability to accommodate different data transmission rates, a good grade of service (circuit availability), high system availability, and availability in all locations. The system utilizes time division multiplexing (TDM) techniques in providing all digital transmission paths. The inherent advantages of a digital transmission system include reliability, maximum channel density and assigned frequency and bandwidths, efficient utilization of transmitted power, maximum potential for system expansion, and flexibility of system configuration.

The data transmission system is composed of three basic elements, namely, a trunking sytem, a switching system, and a local distribution system. These elements are integrated into an end-to-end data communication system specifically designed for the transmission of digital data. The system is equipped with order wire, alarm, and control facilities to insure maximum reliability by providing the capability for rapid maintenance response to outages. The TDM transmission mode of the system provides for maximum conservation of the frequency spectrum. For data transmission purposes, the system provides significant channelization advantages over a fully data loaded frequency division multiplexing (FDM) type of system.

The present invention is directed to a modified system of the same general type as that disclosed in the above-mentioned copending application and more specifically a system of that type which is modified to employ synchronous data transmission which makes it possible to incorporate into the system time division switching in place of the space division switching disclosed in that application. By providing a synchronized network, it is possible to run the time division switch at a much lower speed or alternatively more information can be switched at the same speed, i.e., a higher number of time slots may be provided on a switch highway. By the use of an overlay construction involving a duplication of time division switches it is possible to provide for redundancy and standby in the event of failure or alternatively to provide sufficient time slots and highways to form a completely non-blocking switch.

The basic building block of the network of the present invention is a 4.8 kilobit synchronous data channel. The time division switch matrix in turn consists of only 4.8 kilobit channels. This makes it possible to switch a higher bit rate than 4.8 kilobit by a parallel (simultaneous) connection of more than one 4.8 kilobit channel. At the multiplexing equipment at the customer's end of the circuit the ports are strapped together to achieve the data rate necessary. At the switched end there is no need to strap the ports together since they are treated as individual 4.8 kilobit channels and are switched more or less randomly to trunks, the sequence of the trunk connections themselves not being important. It is only necessary that after having been switched through to the terminating subscriber's end, the sequence be the same as at the originating subscriber's end. This is done in a synchronous network and all bits remain in their relative position as long as the integrity of the network remains; that is, there is no need for concern about phasing or overlapping bits.

There may be alternative geographic routes in larger common carrier configurations. The customer in dialing up multiple parallel circuits cannot be assured that each channel has been accommodated on the same geographic path. Therefore, the variations in delay between sending and receiving could cause variations in phase position of the bit. However, it is a simple matter to program a computer to analyze a synchronizing code sent over the parallel connections prior to sending the data. This program can determine the relative position of the parallel bits from the synchronizing code. Even though there are various paths that parallel bits might take from one end of the country to another if they are in a synchronized digital network it is axiomatic that once they have arrived at a receiving point in an arbitrary phase relation they will not again shift their phase. Although they might not all arrive in the same bit clock position (they would be off by integer bit clock positions) due to various propogation delays, elastic stores within the common network can keep the relative integer bit position the same for the duration of that call.

It is also true that time division multiplexing in a synchronous switched network allows customers to have speed of service under the customer's control at the time the call is initiated. For example, assume that the customer wants up to 48 kilobits service which would require then 4.8 kilobits ports in the multiplex equipment. The user is given an indication through timing pulses at his 48 kilobit data rate where the first port appears, i.e., which of every 10 pulses is the first port and, therefore, which is the second on to the tenth. Thus, when he wishes only 4.8 kilobit service he only uses one out of 10 bit positions after he has indicated to the central office that he is making a 4.8 kilobit call or if he is making a 9.6 kilobit call he is told which two out of ten bit positions he should use, and so on. When a customer is receiving a call it is possible to indicate to the receiving digital communication console during the call setup procedure which speed the call is and from that it can be determined which of the ten bits that constitute the 48 kilobit stream are to be used and which are to be ignored.

Thus, through a system feature a multiplexer hierarchy, synchronous data transmission and time division switching, the present invention provides a data transmission network having increased speed of operation, greater reliability, and more flexibility, all in a simpler and less expensive common carrier format.

It is, therefore, one object of the present invention to provide an improved common carrier type data transmission network.

It is another object of the present invention to provide a national data communication system for the rapid transfer of digital data between subscribers or customers.

Another object of the present invention is to provide a completely digital system for the high speed transmission of digital data.

Another object of the present invention is to provide a digital data transmission system incorporating time division switching.

Another object of the present invention is to provide a digital and transmission system which combines the features of time division multiplexing, synchronous data transmission and time division switching.

Another object of the present invention is to provide a data transmission system having increased flexibility of operation and reduced costs.

These and further objects and advantages of the invention will be more apparent upon reference to the following specification, claims and appended drawings wherein:

Figure 1:
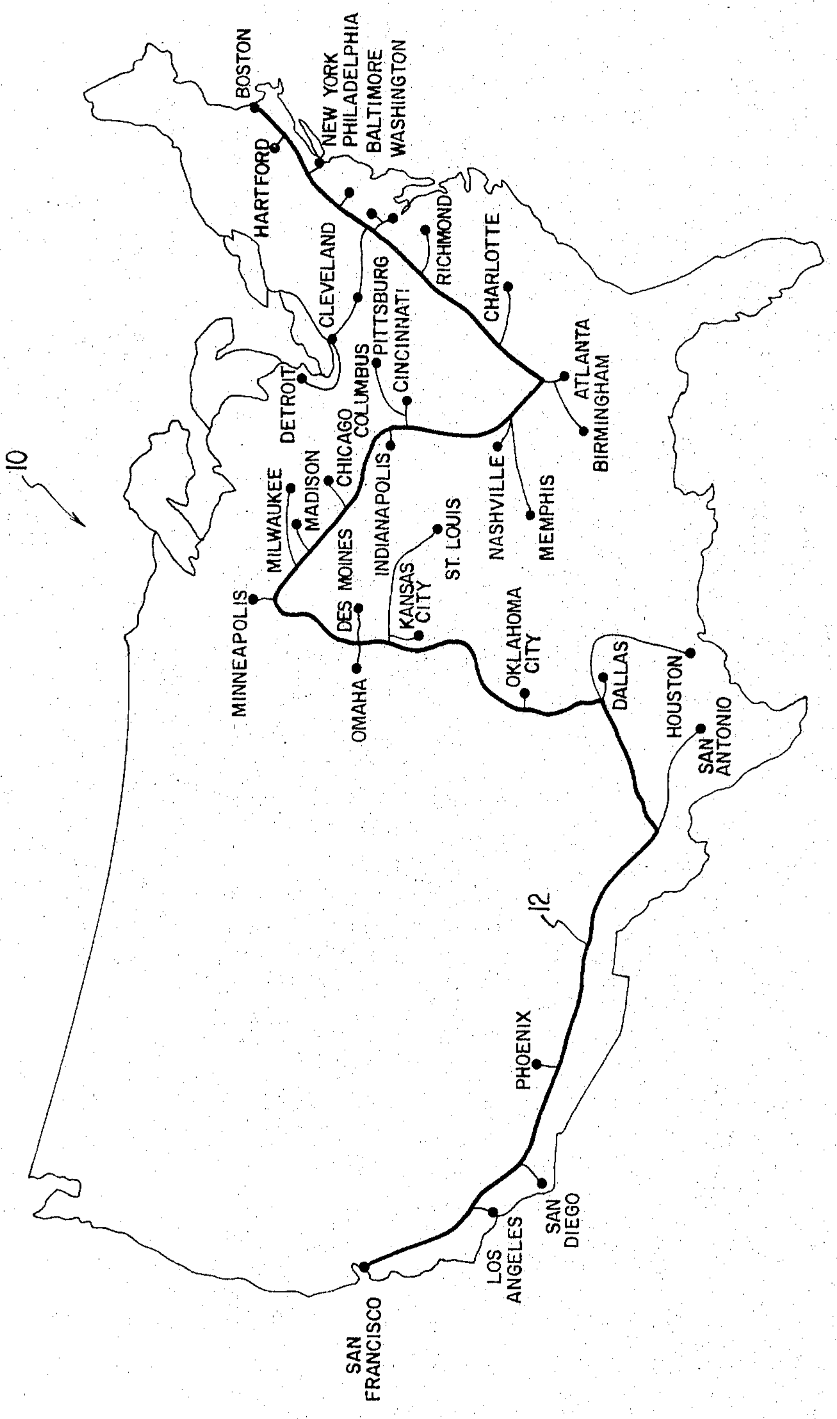
FIG. 1 is a diagram showing the transcontinental data transmission system of the present invention extending from San Francisco on the West Coast to Boston on the East Coast.

Referring now to FIG. 1 of the drawings, the system of the present invention is generally indicated at 10 and comprises an interconnected series of high channel density microwave backbone trunklines 12 following a route between San Francisco, Los Angeles, Dallas, Minneapolis, St. Paul, Atlanta, and Boston. Spur routes from the backbone trunk provide service to additional cities, such as San Antonio, Houston, St. Louis, Columbus, Cleveland, and Detroit. Since it is generally agreed that the market for data communication services will assume large proportions upon the availability of economical digital communication services, the route of the system was mapped to afford the largest possible number of potential subscribers ready access to the system. This selection was accomplished by identifying for initial service cities which are considered to have the greatest potential need for data communications. The principal indicators utilized in identifying each city are total population, number of corporations, dollars sales volume, number of computers, number of communicating terminals, and the number of employees of the corporations. These indicators identified a large number of cities but the 35 cities illustrated in FIG. 1 were selected for initial service on the basis of their immediate high potential interaction of data communications, as well as their proximity to the trunk.

It is recognized that the demand for services may not materiliaze precisely as initially forecast. Any forecast is necessarily a "snapshot" of a point in time and the demand for data communication service will increase substantially and will vary in complexion in the years ahead. It is for this reason that in the design of the system of the present invention great emphasis was placed on engineering flexibility. Channels of communication can be increased as needed to provide for an increase in traffic on a particular route.

The system switch and control is capable of optimizing the utilization of the transmission facilities by precise instantaneous control of traffic routing. It has been determined that ten locations designated as district offices and one location designated as a regional office are sufficient to perform this function in the initial stages. A modular technique has been adopted throughout the system to facilitate not only additions to the initial system capability but rapid geographic augmentation to meet market demand.

The nationwide data communication network of the present invention has been designed to meet the major objectives of high reliability, rapid connection, ability to accommodate different data transmission rates, grade of service (circuit availability), system availability, and availability in all locations. The present system is designed to provide a degree of error rate probability less than $10^7$. This will result in an average of no more than one error during transmission of 10,000,000 bits of data. The reliability of the system is derived from a number of technological features, a major one of which is the integrity and continuity achieved by the system's TDM transmission mode. Other contributing factors to this high degree of accuracy includes state of the art design, off-the-shelf equipment where available, and conservative path engineering including space diversity reception.

A data transmission path between any two compatible subscribers is established within 3 seconds following receipt of the last digit of the address identifying the designation.

A graduated scale of data rates are offered on a switched service basis to accommodate the growing demands for reliable, available and economical data transmission facilities, while maintaining compatibility with existing data communicating terminals. Initially, service up to 2,000 bits per second (bps) in the asynchronous mode and up to 14,400 bps in the synchronous mode of transmission are provided on a switched basis. The network is constructed to accommodate greater speeds of switched services as the market requires. In addition to the above speeds, 19,200 bps and 48,000 bps may be provided.

All channels, trunks, and switch matrices integrated into the network are designed and calculated to meet a grade of service goal of P.01 during the busy period. On an average no more than one busy indication in 100 attempts should be encountered due to network control. Outside of the busy periods, the grade of service approaches that of a non-blocking network. For intraoffice traffic, a non blocking grade of service is provided.

The network design objective is to provide very high availability. The transmission system provides battery reserve standby power and alarm and order wire systems at all remote sites. Both transmission and switching systems maximize reliability by means of redundant equipment. The system ultimately will serve all locations desiring service. In all stages of system development and thereafter, the system can be interconnected with other carriers or authorized communications entities on a realistic basis in order to provide service to all locations, as well as to offer flexibility to meet individual customer requirements.

The system of the present invention is completely transparent in that a subscriber need not convert his signals to a different transmission mode since the system transmits the digital signal in its original form. Maximum continuity is preserved and transmission efficiency is heightened. A further significant characteristic of a digital transmission system is the manner is which the signals are relayed. Each microwave station in the system is regenerative, it restores the symbol or bit pattern and transmits a new, clean and conditioned signal. Thus, noise is not cumulative as it is in analog transmission systems, and errors in transmission are reduced accordingly. Provisions for higher bit rate capabilities can be accomplished by a wiring change at the multiplexer servicing the subscribers and installation of new equipment is not necessary and no other changes are required in the basic transmission system.

For the user with simple terminals having no capability for error detection and correction, the system of the present invention offers the material advantage over present systems in that far fewer errors in transmission occur. The order of reliability is such that the frequency of retransmission due to network introduced errors is substantially reduced over that occurring in present systems. In short, data transmission by means of an end-to-end digital system is provided at a high speed and with excellent reliability.

In the present invention, the network makes full use of time division multiplexing (TDM) techniques, with simple phase shift keying of the radio transmitter to increase the efficiency of data transmission. The same techniques are utilized throughout the entire network, including the main trunk, spurs and local distribution systems. The transcontinental trunking system is designed so that the average hourly error rate will not exceed 1 bit error in $10^{-7}$ bits transmitted in the system. Errors occur mainly during the period of deep fading (50 db or more) and considering the low probability that more than 10 links in a given circuit will undergo such deep fades during the same hour, it is conservative to allocate a link error of $10^{-8}$.

The signals resulting from the time division multiplexing process are applied to a modulator which generates a multiphase signal. This signal is further amplified by the transmitter and applied to an antenna for transmission. The modulator can be replaced with other modulator equipment with higher indices, so that approximately four thousand 4,800 bps channels may be transmitted simultaneously over a single radio path. The received signal is amplified, demodulated, and conditioned to provide a clean, high speed data signal as an input to the demultiplexer. This demultiplexer separates the composite high speed signals into channel grouping suitable for input into the time division switch matrix. This switch directs the appropriate signal channels to the desired subscriber by way of the local distribution loop. Operation of the total system is full duplex (two-way simultaneous transmission).

The TDM techniques embodied in the network assign to each data channel a specific time slot for the transmission of data. In this way, the full power of the transmitter is delivered to each discrete time slot, avoiding the problems in conventional FDM systems caused by varying load conditions which occur where power must be shared with each additional channel added. The processing of each channel is identical to all other channels, and degradation in system performance due to variance loading is avoided. The channelization equipment, or multiplexers, are modular in design permitting economical installation. Expansion is readily accomplished by the installation of additional multiplexers and by making necessary adjustments to the radio equipment.

Low speed channels (150 bps) can be derived from 4,800 bps channels, again using TDM equipment. Special switched service groups, such as 9,600 bps and 14,400 bps, can also be provided by combining 4,800 bps channels. The multichannel capability required for this class of service requires only a wiring change. Additional channels required to accommodate an increased new service can be provided on a plug-in basis. The described transmission system is not limited to an upper range of 14,400 bps. Higher bit speeds are available upon special order in increments of 4,800 bps. The channel capacity of the radio system permits a reasonable upward extension of channels so that the capacity of the initial network can be increased without requiring additional radio circuits.

Functional components in the system are packaged in modules for economic installation and ease of upgrading. This procedure permits segments of the network to expand as the demand for transmission of data increases. All the many packages requiring integration to form the data communications network are within current technology and to minimize logistic and facilitate centralized parts distribution, all sites use identical equipment in quantities depending on the number and type of subscribers being serviced. This standardization of equipment permits more efficient installation of facilities.

The data carried on the system is transmitted over a highly density microwave channel backbone trunk illustrated at 12 in FIG. 1 traversing the United States on a route which has been designed to serve the major data concentration points in the country. Spur trunks utilizing identical electronic equipment carry the data to city locations specified as district offices, lying off the backbone trunk route.

This trunk consists of microwave stations, each of which is either a repeater or a branching repeater. Each repeater receives, amplifies, and transmits all channels in the microwave path; a branching repeater has the additional capability of allowing a portion of the channels to be inserted. The channels dropped may be terminated at that point or may be transmitted over a microwave spur to provide service at locations not on the primary route. Connected to the microwave system are regional offices (RO) which control the activity of the network. Each RO has direct control of up to 10 district offices (DO) where switches are located. Each district office in the network can communicate with all regional offices, and can economically provide termination points for 1,000 to 6,000 terminals.

Communications equipment and associated multiplex and auxiliary equipment are housed in buildings or shelters of sufficient size to accommodate auxiliary power generation equipment and local battery supply in separate fireproof rooms. These buildings are generally of masonry construction with design modifications to allow for differences in environmental conditions. Depending on local conditions and regulations, some locations utilize prefabricated fireproof shelters. All buildings are constructed in conformance with local building codes and regulations. Sufficient property is provided to accommodate the buildings, outside fuel supply, and tower foundations. In most cases, the perimeter of the property is fenced and locked. Commercially or locally generated electric power is available at all sites and, additionally, a battery supply is provided at each site with reserve capacity capable of maintaining equipment operation for at least eight hours without recharging. Each site is equipped with standby generators to provide power automatically to the batteries in the event of primary power failure. Power generation equipment is sequenced automatically at regular intervals to insure availability.

A station alarm system provides the maintenance control point with status information regarding the system status at each of the stations under surveilance. For example, the status of power is shown whether the station is operating on primary standby power or solely on battery reserve. A number of other conditions is shown also, such as transmitter and receiver operation, tower light operation, unauthorized entry, and the like. A capability exists to control certain functions at the stations from this alarm point, such as start generators, reset transmitters, and turn on floodlights. In each building, provision is made for ambient temperature control as required by the environmental demands of the site. Space air conditioning is provided where warranted, otherwise properly filtered, humidity controlled forced air ventilation is furnished. Thermostatically controlled electric space heaters are provided to maintain a constant temperature during the winter season.

Towers are of sufficient height to allow for necessary clearance and space diversity separation between antennas. The towers are generally self-supporting and entineered in accordance with current E.I.A. standards applicable to tower design. High performance, shrouded antenna reflectors with diameters appropriate to path performance requirements are used throughout the system. Low loss elliptical waveguide, factory cut to pre-engineered length, is used to insure ease in installation and maintenance and to insure low loss performance. Radomes or reflector cloths are utilized where local winter conditions so dictate.

The network is configured and the application software designed to permit a district office receiving a request for service to contact directly the regional office servicing the destination district office to secure a trunk assignment. In the event a primary trunk to the destination is not available, the regional office selects an alternate route and thereby completes the connection. In either event, a maximum of three switching centers is required to complete the connection. This network configuration and the computer software displines combined with efficient and reliable high speed switching equipment is designed to provide graphic response (within 3 seconds) and reliability required by the present day and future data communications user.

Following is a list of the 35 cities for which services is illustrated in FIG. 1 and a breakdown of the district and regional office locations and the channelization for the respective cities:

| | |
|---|---|
| 1. San Francisco | 19. Columbus |
| 2. Los Angeles[1] | 20. Louisville[1] |
| 3. San Diego | 21. Nashville[2] |
| 4. Phoenix | 22. Memphis |
| 5. Dallas | 23. Birmingham |
| 6. Houston | 24. Atlanta |
| 7. San Antonio | 25. Charlotte |
| 8. Oklahoma City | 26. Richmond[1] |
| 9. Kansas City | 27. Washington |
| 10. St. Louis[1] | 28. Baltimore |
| 11. Omaha | 29. Pittsburgh[1] |
| 12. Des Moines | 30. Cleveland |
| 13. Minneapolis | 31. Detroit[1] |
| 14. Madison | 32. Philadelphia |
| 15. Milwaukee | 33. New York[1] |
| 16. Chicago[1] | 34. Hartford |
| 17. Indianapolis | 35. Boston |
| 18. Cincinnati | |

-Continued

1 District Office Location
2 Co-located District & Regional Office

In calculating the quantity of 4,800 bps channels required between each point of the transcontinental microwave system, an analysis of calling frequency, by class and traffic characteristics during the busy period, was made. The results are reflected in the trunk segments and interstate channel requirements which follow.

CHANNELIZATION

Main Trunk

| Segment | No. of 4800 bps Channels |
|---|---|
| Boston to Hartford | 2600 |
| Hartford to New York | 800 |
| New York to Philadelphia | 1600 |
| Philadelphia to Pittsburg | 3800 |
| Pittsburgh to Washington | 2800 |
| Washington to Richmond | 3800 |
| Richmond to Charlotte | 4000 |
| Charlotte to Atlanta | 3400 |
| Atlanta to Nashville | 4000 |
| Nashville to Louisville | 3400 |
| Louisville to Columbus | 4000 |
| Columbus to Indianapolis | 3400 |
| Indianapolis to Chicago | 2800 |
| Chicago to Milwaukee | 4000 |
| Milwaukee to Madison | 3200 |
| Madison to Minneapolis | 3000 |
| Minneapolis to Des Moines | 2000 |
| Des Moines to Omaha | 2200 |
| Omaha to St. Louis | 2800 |
| St. Louis to Oklahoma City | 2200 |
| Oklahoma City to Dallas | 2000 |
| Sallas to San Antonio | 1200 |
| San Antonio to Phoenix | 1000 |
| Phoeniz to San Diego | 1600 |
| San Diego to Los Angeles | 2000 |
| Los Angeles to San Francisco | 2400 |

Spurs

| Segment | No. of 4800 bps Channels |
|---|---|
| Hartford BR to Hartford | 2000 |
| New York BR to New York | 1000 |
| Philadelphia BR to Philadelphia | 2400 |
| Pittsburgh BR to Pittsburgh | 3800 |
| Pittsburgh to Cleveland | 2600 |
| Cleveland to Detroit | 800 |
| Washington BR to Baltimore BR | 1200 |
| Baltimore BR to Baltimore | 600 |
| Baltimore BR to Washington | 800 |
| Richmond BR to Richmond | 2400 |
| Charlotte BR to Charlotte | 800 |
| Atlanta BR to Atlanta | 400 |
| Atlanta BR to Birmingham | 800 |
| Nashville BR to Nashville | 7600 |
| Nashville BR to Memphis | 600 |
| Louisville BR to Louisville | 2200 |
| Columbus BR to Cincinnati BR | 1000 |
| Cincinnati BR to Cincinnati | 600 |
| Cincinnati BR to Columbus | 600 |
| Indianapolis BR to Indianapolis | 800 |
| Chicago BR to Chicago | 3200 |
| Milwaukee BR to Milwaukee | 1200 |
| Madison BR to Madison | 400 |
| Minneapolis BR to Minneapolis | 1200 |
| Des Moines BR to Des Moines | 400 |
| Omaha BR to Omaha | 1000 |
| St. Louis BR to Kansas City BR | 3200 |
| Kansas City BR to Kansas City | 1000 |
| Kansas City BR to St. Louis | 4000 |
| Oklahoma City BR to Oklahoma City | 400 |
| Dallas BR to Houston BR | 1200 |
| Houston BR to Houston | 400 |
| Houston BR to Dallas | 1000 |
| San Antonio BR to San Antonio | 400 |
| Phoenix BR to Phoenix | 800 |
| San Diego BR to San Diego | 600 |
| Los Angeles BR to Los Angeles | 4000 |

BR - Branching Repeater

Each trunking station is provided with alarm and control functions to permit remote site status monitoring and remote control of some site functions from control stations within the system. Control alarm points, generally located at district offices where 24-hour monitoring supervision can be easily provided, are distributed throughout the system.

Two types of order wire systems are provided in the network. An express order wire system is installed to provide direct communications between control alarm points. A local order wire system allows station-to-station conversation. Because the order wire systems are co-located with multiplex terminals, order wire channels can be operated synchronously. A full channel sampling rate of approximately 20 kbs may be used to transmit order wire voice samples and thus provide a reasonable quality of digitized voice transmission. An order wire channel occupies only one data channel and the order wire systems require one data channel for each station.

The alarm transmitting equipment at each station is provided with 32 alarm functions and 16 on-off control functions. One channel of the data transmission system (in each direction) is sub-multiplexed to provide this service. In the alarm sub-system, the inverter converts parallel alarm sensor inputs into a serial pulse stream with each pulse corresponding to a monitored function. At the master stations, located at control points, the stream is converted to a parallel output by the decoder. These outputs operate the master station alarm and control display circuitry. The control sub-system operates in a similar fashion, but in the reverse direction of transmission.

The present network represents the combination of digital transmission paths with two functionally different types of switching centers. The switching centers are the district offices which provide the subscriber's connection and regional offices which maintain network control. Both types of offices use identical equipment to perform identical or similar functions. For functions performed in one office or the other, a unique complement of equipment is provided. In all the switching centers, redundant equipment insures that the nonavailability of any unit will not cause the failure of the system. The salient functions performed by the district office are (1) provides subscriber terminations, (2) responds to all requests for service, (3) insures subscriber-to-subscriber compatibility by way of class code distinction, (4) determines and establishes intra-office switch linkage, (5) coordinates with regional office trunk assignments for inter-office transmission, (6) maintains records of all services provided to each subscriber (for building purposes), (7) maintains necessary statistical information for future analysis, and (8) provides maintenance, status and suspect component identification.

The salient features of the regional office are (1) it maintains a complete network directory and (2) assigns all trunks within its area of jurisdiction, (3) determines and establishes intra-office switch linkage, (4) establishes alternate paths as required, (5) collects network use information from each district office at prescribed intervals, (6) maintains necessary statistical information for future analysis, and (7) provides maintenance, status and suspect component identification.

The number and geographical locations of the district and regional offices are dependent upon the number of subscribers and their locations. System expansion is based upon the expected trends in growth of the data communications market. As a consequence, the network is targeted toward establishment of 35 district offices strategically located across the United States so as to best serve the needs of the emerging data communications market.

Each subscriber utilizes a digital communications console to interface with the system. Entrance to the network may be either "local" or "remote." Local subscribers are represented in the district office switching equipment as a unique appearance. Remote subscribers are those whose geographic location is beyond the economic range of a district office. These subscribers may enter the network through a concentrator. The subscriber may also be located some distance from the concentrator, in which case connection is provided by digital microwave stations or conventional analog facilities.

Each switching center is configured in a modular fashion consistent with present packaging techniques and sound economical considerations. The heart of the switching center is a time division switch presenting a new approach to the problem of processor-control communications. This system minimizes the need for processor intervention in communications processing, while providing for continuous monitoring of the operating efficiency of the system elements. To accomplish this, the following is provided: (1) hardware to monitor the operating efficiency of each of the elements in this system; (2) highly communications-oriented input/output section; and (3) an instruction repertoire and memory capacity designed to facilitate the formating of large amounts of communications data. The switching common control function in each switching center — regional or district office — is provided by a communications processor which controls all other modules and processes the supervisory and subscriber requests for source commands.

The main storage for the system is a core storage module. The cycle time for core storage is 750 nanoseconds, with the validity of data insured by a parity check performed automatically in the communications processors.

The unit providing the communications path for the transmission of data from one subscriber to another is the switch matrix which is controlled by the communications processor. The switch matrix uses existing components, repackaged to be more compatible with data transmission characteristics and is modular to facilitate growth. All paths through the switch matrix are full duplex, permitting transmission of digital data in each of two directions simultaneously. The size of the communications processors, the number of associated peripherals, and the sizes of the switch matrix at any office is determined by the number of subscribers to be accommodated. System objectives of rapid response, circuit availability, and reliability are maintained.

The digital communications console is installed at each subscriber site and provides the subscriber with the means of communicating with the district office through a key pack display console. Through the DCC, an operator generates the appropriate digits for directing the district office to establish a switched connection to another subscriber. The DCC may be operated automatically or manually. In either mode of operation, a system of indicators readily scanned by an operator provides an immediate overview of the operational status. The responsibility of initiating action to establish a connection from one subscriber to another rests with an operator in the manual mode of operation or a properly programmed computer in the automatic mode.

Existing data transmission service often provides substantially reduced capability and reliability in total or end-to-end communications services because of the reduced transmission quality of the local distribution circuits. The present invention incorporates a local distribution system compatible in performance with the other transmission elements of the network and consistent also with the communications services to be offered. The subscriber interface conforms to standards described in E.I.A. RS-232C and RS-366. Consequently, no changes in subscriber equipment is required.

For the subscriber utilizing the local distribution system of the present invention, the continuity of the digital signal from the data terminal or computer communications terminal is maintained to its destination. No digital-to-analog conversion is required for local distribution and the complexity of the communications interface to the network and attendant maintenance and reliability problems are reduced accordingly.

The local distribution facilities comprise specifically configured, low powered microwave equipment operating in the 11 GHz common carried band. This band is generally free of frequency congestion. In order to optimize the utilization of frequencies, the local distribution system is designed to provide maximum subscriber density on each link.

In a typical city, subscribers may be distributed in cluster arrangements, composed of several concentration points of relatively high density. Such points may be industrial parks, large office buildings, areas of concentrated business bordering circumferential highways, shopping centers, and office building complexes. An additional number of data concentration points of lesser density may be designated in other appropriate locations until economic considerations preclude the use of microwave radio equipment for local distribution. The microwave terminals are used only to provide a digital connection to the district office. In the vicinity of the terminal, multi-pair cable is installed radially from the microwave terminal to other subscriber locations.

A multi-tier or ring configuration of microwave terminal locations totalling approximately 50 microwave stations are used to service the data concentration points basic area covered by a district office. Maximum radio link lengths are five miles and signals from distant stations are repeated from the outer tier or ring to the inner ring. To insure availability of frequencies, no microwave station receives more than four frequencies.

In summary, the local distribution system consists of 16 basic microwave terminals, each with a 100 channel drop and insert capability and two basic terminals with a 200 channel drop and insert capability. Additionally, the system has four high density terminals, each with a 400 to 1,000 channel drop and insert capability. The local distribution system has the capability of terminating approximately 1,700 4,800 bps subscriber terminals without the use of a line concentrator. For further expansion, a capability is provided that allows the use of line concentration. Subscribers having low speed transmission requirements are accommodated by the use of submultiple TDM multiplexers. Subscribers with requirements higher than 4,800 bps are accommodated by strapping input points of the multiplexer.

In most cases, it is possible to achieve line-of-sight range between the terminal points. Where possible, the antenna is located on the building in a manner to provide shielding to minimize mutual interference with other stations. The low power levels used in the transmitters largely relieve this problem. In those instances where a building or other structure interferes with line-of-sight, passive repeaters are utilized. Where active repeaters are required, the basic microwave without drop and insert capability can be used in an extremely low cost installation to repeat the channels.

The present system is designed to provide interconnection capability with other TDM or other analog modes of transmission. Other TDM carriers can be interconnected directly with the transmission system at a branching repeater or district office. Moreover, any repeater on the system can be converted into a branching repeater by installing digital equipment.

Interconnection is not restricted to like mode carriers. Other microwave carrier or cable systems can interconnect with the present network regardless of transmission characteristics of carrier system. However, appropriate interfacing equipment is required and the characteristics of the sevice to the customer on an end-to-end basis is limited by the lowest quality characteristics as between the two systems. Satellite connection with the system is feasible, although dependent upon development of suitable terminal hardware to accommodate problems peculiar to the increased transmission distance of satellite transmission.

In addition to interconnection, it is possible to integrate capabilities other than microwave into the system transmission.

Figure 2:
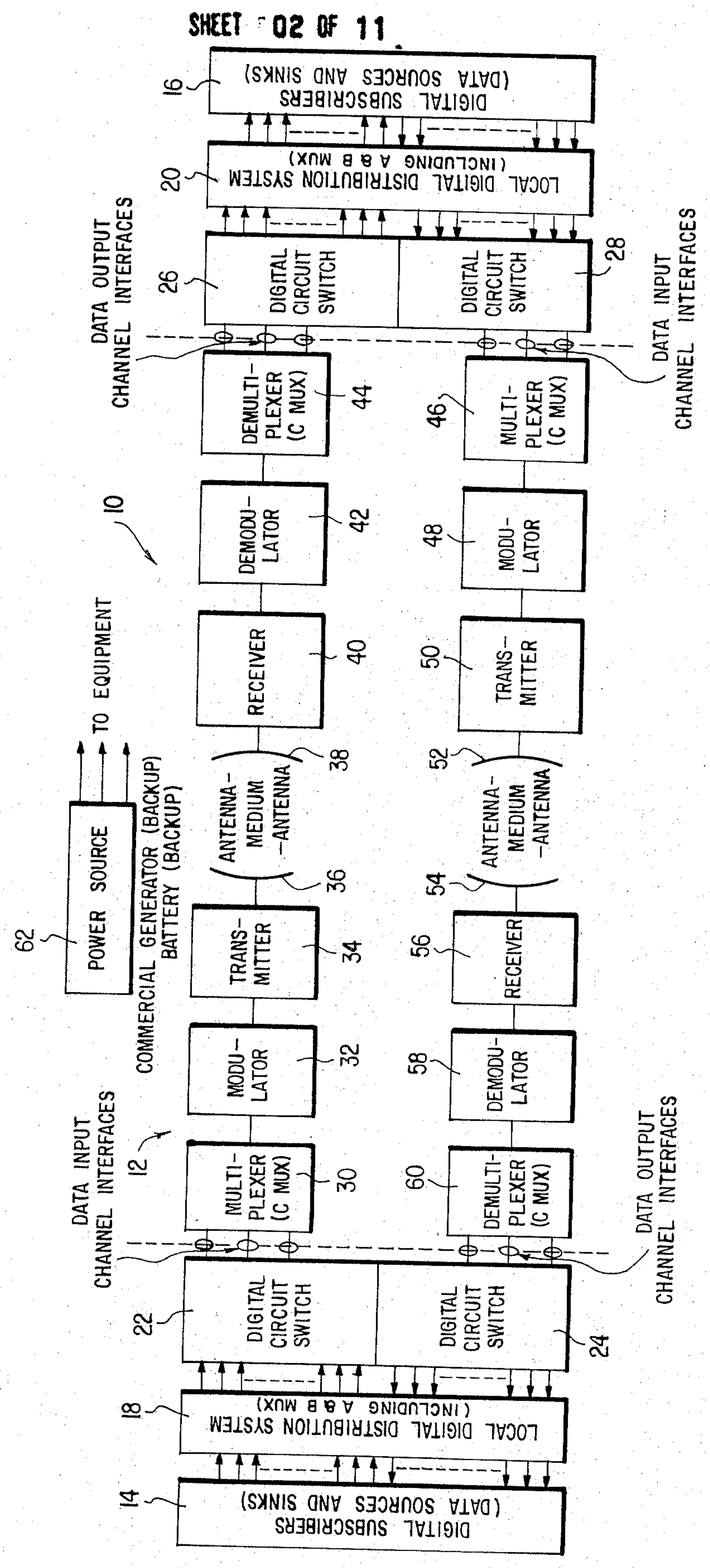
FIG. 2 is a simplified block diagram showing the time division multiplex system of the present invention.

FIG. 2 is a simplified overall block diagram of the basic system 10 of the present invention. The system is shown as connecting a first set of digital subscribers 14 at one point in the system to a second set of digital subscribers indicated at 16. The digital subscribers are connected through local digital distribution loops 18 and 20, respectively. Local distribution system 18 is connected to the trunking system 12 by digital circuit switches 22 and 24. Local digital distribution system 20 is similarly connected into the trunking system by digital circuit switches 26 and 28.

Transmissions from the digital subscribers 14 pass through the local distribution system 18 and the digital circuit switch 22 to a multiplexer 30, modulator 32, and transmitter 34, where they are transmitted by a microwave antenna 36 through the air (and by way of suitable repeaters where necessary) to a receiving antenna 38. The received signals pass through receiver 40, demodulator 42, and demultiplexer 44, where they are applied through digital circuit switch 26 and local digital distribution loop 20 to the subscribers 16. Similarly, signals from subscribers 16 are transmitted through the local distribution loop or system 20, and digital circuit switch 28 to a corresponding multiplexer 46, modulator 48, transmitter 50, and transmitting antenna 52. These signals are picked up by receiving antenna 54 and passed through receiver 56, demodulator 58, demultiplexer 60, and pass through digital circuit switch 24 and local loops 18 to the subscribers 14. Power sources are provided for the various components as indicated generally at 62 and these comprise commercial power sources, local generators as backup, and battery power supplies also as backup and rechargeable from the generators.

As can be seen from FIG. 2, the overall system starts and ends with the digital subscribers. These are the data sources and sinks as shown at the extreme right and left of the block diagram. Each subscriber is connected to the overall system by means of a local digital distribution loop. The loops are in turn connected to a digital circuit switch which selects an appropriate circuit for the generated data transmission or selects the address at which the incoming data is to be terminated.

Starting at the top left of the block diagram in FIG. 2, the digital circuit switch interfaces with the multiplexer by means of a plurality of data input channel interfaces. The multiplexer 30 combines the separate data channels into a single high speed data stream operating at approximately a 20 megabit rate. This 20 megabit data stream is applied to the modulator 32 which generates a bi-phase signal. The bi-phase signal is further amplified by the transmitter 34 and applied to the antenna 36 for transmission. The received signal is first amplified in the receiver 40, then demodulated in the demodulator 42 where the data stream is also conditioned to provide a clean, high speed data signal as an input to the demultiplexer 44. The demultiplexer 44 separates the composite high speed signal into corresponding subgroups and applies these data streams to the digital circuit switch 26. The function of this switch is to direct the appropriate signal channels to their respective subscribers or addresses, and apply these signals to the data sinks.

Since the overall operation is fully duplex, signals generated by data sources at the subscriber locations can be transmitted simultaneously back to the other end of the system. The data processing is identical to that just described as the two channels shown at the top and bottom of the block diagram of FIG. 2 are identical, one providing a signal path from the left to the right and the other serving the data sources on the right and data sinks on the left.

Figure 3:
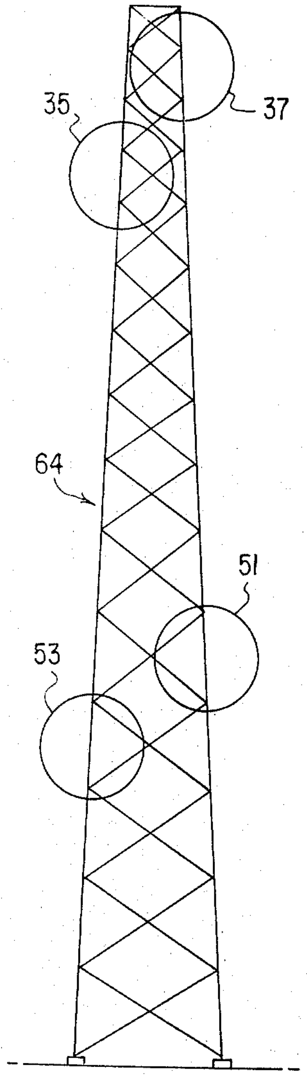
FIG. 3 is a schematic view of a preferred relay tower construction in accordance with the system of this invention.

FIG. 3 shows a preferred antenna tower arrangement used in the system of FIG. 2 and indicated generally at 64. While separate send and receive antennas, as illustrated in FIG. 2, can be used, in the preferred embodiment the upper antennas 35 and 37, illustrated in FIG. 3, act as both transmitting and receiving antennas. These antennas are of the conventional hyperbolic reflector type and by way of example antenna 37 may be provided for sending and receiving in a first direction, i.e., West, and antenna 35 is provided for both sending and receiving in the opposite direction, i.e., East. Antenna 51 is a standby receiving antenna for receiving signals from the first direction, i.e., West, and antenna 53 is a standby receiving antenna for receiving signals from the other direction, i.e., East. The standby antennas 51 and 53 provide space diversity and are automatically switched in when the signal strength at the corresponding upper antenna falls below the signal strength at the lower antenna. Simultaneous transmission and reception by antennas 35 and 37 is made possible by transmitting at one carrier frequency and receiving at a different carrier frequency with both carrier frequencies lying in the 6 or 11 mHz frequency band. By way of example only transmission might be at a carrier frequency of 6256.5 mHz and reception at 6137.9 mHz.

Figure 4:
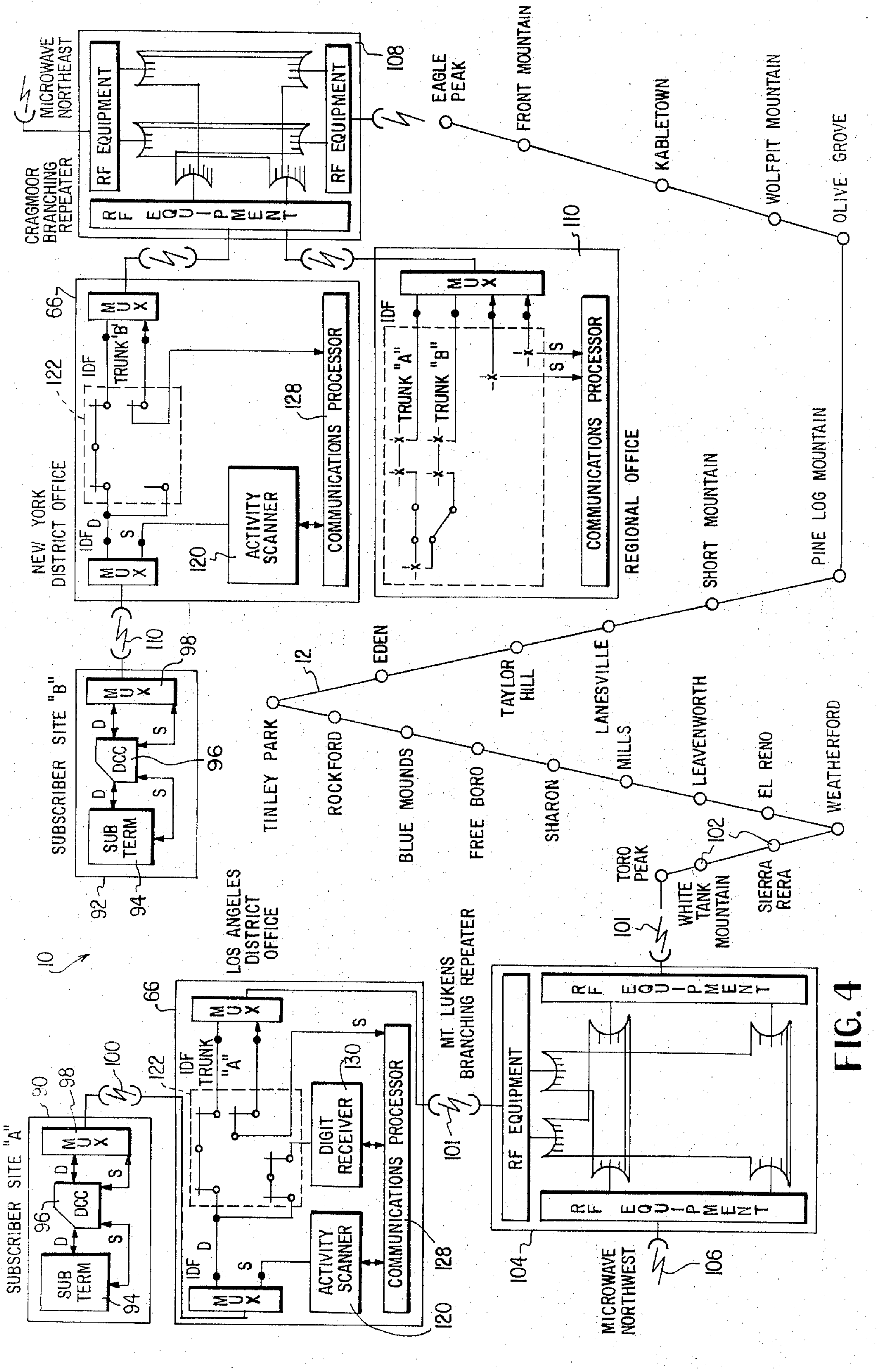
FIG. 4 is a system diagram showing a transcontinental digital connection inter-office call between Los Angeles and New York.

FIG. 4 is a slightly more detailed diagram of the system 10 of the present invention showing some of the circuitry of the district and regional offices. FIG. 4 shows an arrangement for connecting between a subscriber site A indicated at 90 and located at Los Angeles, with a subcriber site B indicated at 92 and located at New York. The subscriber circuitry is the same and comprises a subscriber terminal 94, such as a computer or the like, a digital communication console DCC 96 for controlling the call, and a multiplexer/demultiplexer (MUX) 98. Connection is by way of a local distribution loop including a microwave link 100 to the Los Angeles district office 56.

From the district office, the communication signal passes through the microwave backbone link 101 to suitable repeaters indicated by the circles 102. A typical branching repeater is indicated at 104 and this branching repeater is illustrated as not only capable of relaying the signal from the Los Angeles district office to the Toro Peak repeater, but also adding signals received by a microwave antenna 106. It is understood that the branching repeaters may add channels, drop channels, or both.

The signals from subscriber site A pass through the microwave repeaters 102 and through an eastern branching repeater 108 to the New York district office 66 and to a regional office 110. The signal passes from the New York district office to subscriber site B at 92 by way of a local distribution loop including microwave link 110.

Figure 5:
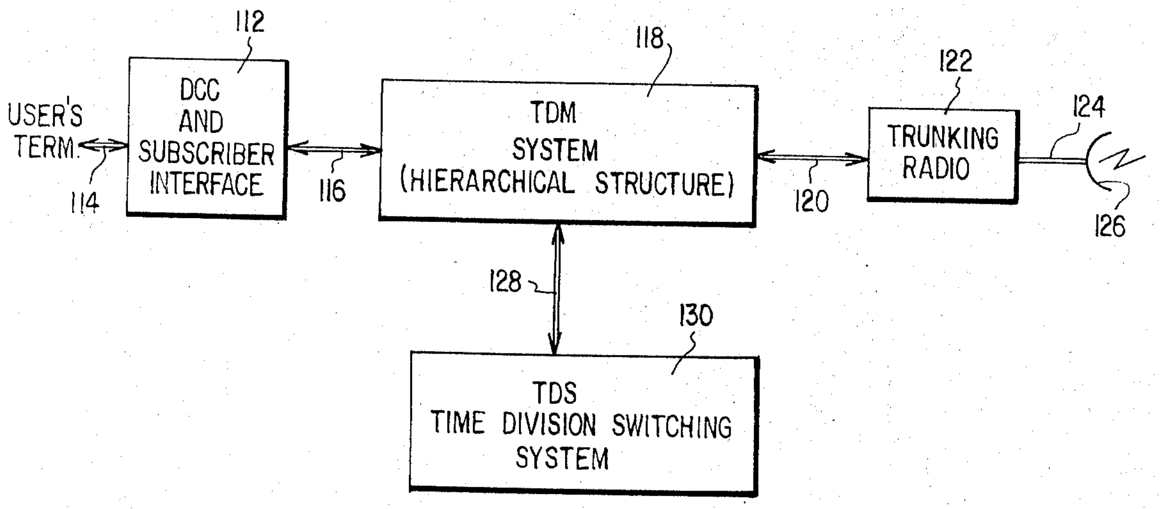
FIG. 5 is a simplified block diagram showing the relationship between the time division multiplexing (TDM) and time division switching (TDS) in the system of the present invention.

FIG. 5 is a simplified block diagram of a portion of the system of the present invention illustrating the combination of time division multiplexing (TDM) with time division switching (TDS). The DCC and subscribers interface equipment illustrated at 112 is connected to the user's terminal by the two-way transmission path 114. A second two-way transmission path 116 connects the user's equipment to a three stage time division multiplexer system generally indicated at 118. This is in turn connected by a two-way path 120 to the trunking radio 122, in turn connected by a two-way path 124 to the combination transmit and receive antenna 126. As previously indicated, signals are sent by antenna 126 at one carrier frequency and simultaneously received at a different carrier frequency. In the preferred embodiment the carriers for the microwave links lie in either 6 or 11 mHz frequency bands. As more fully disclosed in assignee's copending Application Ser. No. 88,069 filed Nov. 9, 1970 and incorporated herein by reference, the microwave backbone trunk carriers are binary modulated to assume one of at least two possible phases by minimum shift keying techniques to provide a completely digital system of data transmission. One phase of the microwave carrier is indicative of a mark and another phase is indicative of a space. Connected to the TDM system 118 by a two-way transmission path 128 in FIG. 5 is a time division switch system 130.

Figure 6:
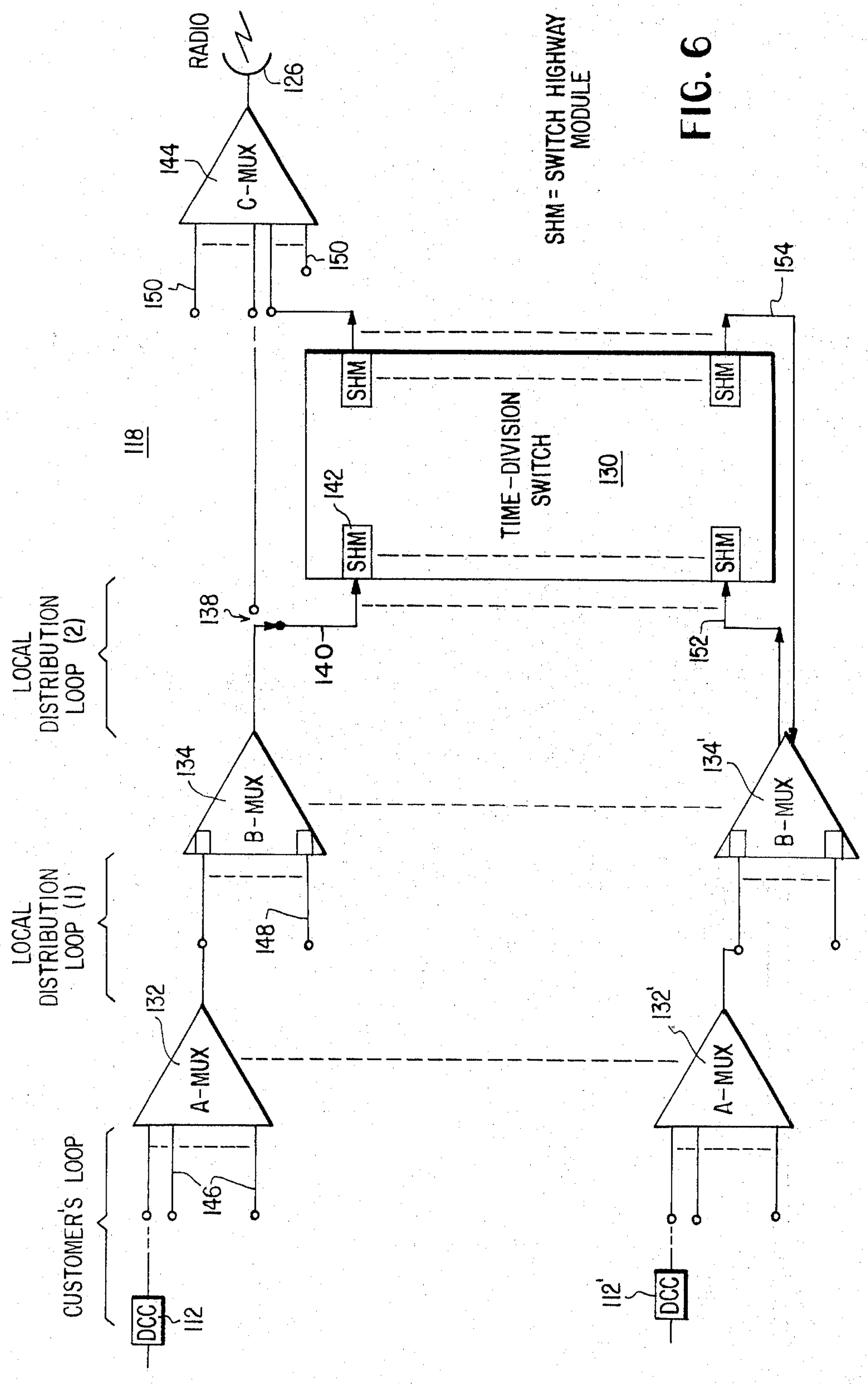
FIG. 6 is a slightly more detailed block diagram showing the connection of the time division switch to the multiplexer hierarchy in the system of the present invention.

FIG. 6 is a slightly more detailed block diagram of the system showing the three stage or three level multiplexer hierarchy forming the time division multiplex system 118 of FIG. 5. The subscriber or customer DCC 112 is shown connected to an A level multiplexer/demultiplexer 132 (A-MUX) in turn connected to a B level multiplexer/demultiplexer 134 labelled B-MUX. The B-MUX 134 is in turn connected through a switch 138 by way of a lead 140 to the time division switch 130 which includes a plurality of switch highway modules (SHM) 142 as more fully described below. If no switching is necessary or desired at this end of the line, switch 138 may be actuated to connect the output of B-MUX 134 directly to a C level multiplexer/demultiplexer 144 labelled C-MUX which is in turn connected through the trunking radio 122 of FIG. 5 to transmit receive antenna 126. Additional inputs to the A-MUX 132, B-MUX 134, and C-MUX 144 are illustrated, respectively, by the input/output lines 146, 148 and 150, respectively. It is understood that several DCCs 112 are connected to A-MUX 132, that several A-MUXs are connected to B-MUX 134 and that several B-MUXs are connected either directly or through the time division switch 130 to the C-MUX 144 so that a multiplexer/demultiplexer hierarchy is formed with the high side, (the right side in FIG. 6) of each multiplexer being at a higher bit rate than the preceding multiplexer in the hierarchy.

The connection of A-MUX 132 and B-MUX 134 in FIG. 6 illustrates transmission and reception through the microwave trunk by way of antenna 126 and this connection is shown either directly or through the time division switch 130 as the case may be. A local switching system is illustrated by the additional DCC 112', A-MUX 132', B-MUX 134'. These multiplexers/demultiplexers form part of a local distribution system which acts to switch local calls through the time division switch 130 as indicated by the input lead 152 to the switch and the output lead 154 back to the B-MUX 134'. It is understood that time division switch 130 can connect any input to any output so that it is capable of switching both trunk calls and local calls, the two different cases being illustrated by the representative DCCs 112 and 112'.

The details of the multiplexer hierarchy illustrated in FIG. 6 may vary widely and involve many considerations. However, briefly and by way of example only A-MUX 132 may be connected on its low side to 34 channels 146 having a maximum transmission rate of 4.8 kilobits per second. The high side of A-MUX 132 has a bit rate of approximately 168 kilobits per second obtained by bit stuffing and other techniques and fifteen A-MUXs 132 are connected to the low side of B-MUX 134 so that the high side of B-MUX 134 has a bit rate of approximately 2.15 megabits per second. Ten B-MUXs 134 are connected to the low side of C-MUX 144 so that the high side of C-MUX 144 has a bit rate of 21.504 megabits per second. This provides a total of 4,480 4.8 kilobits per second channels.

Figure 7:
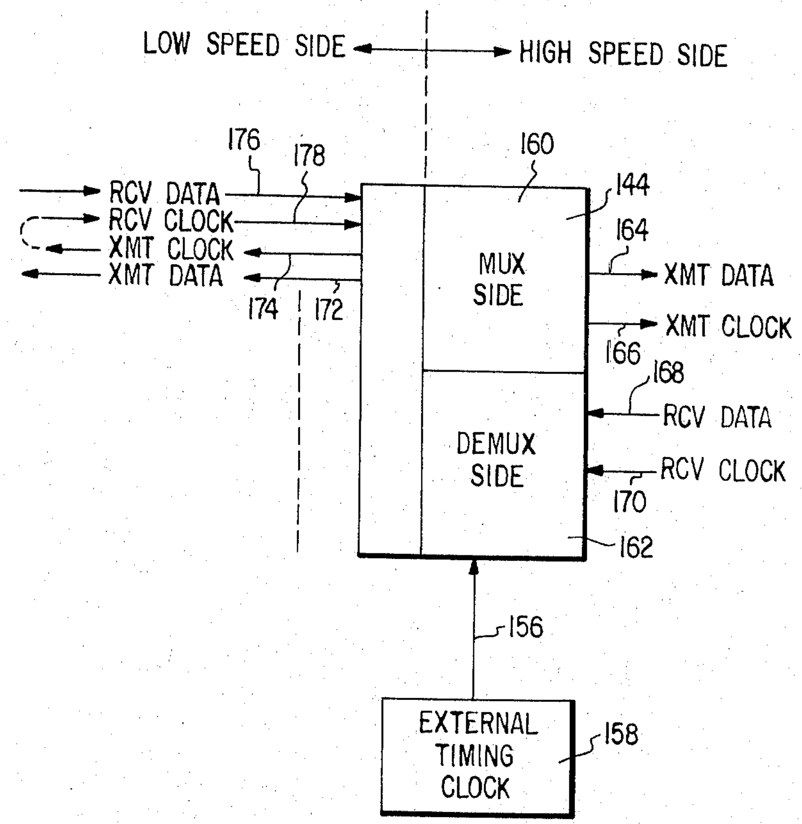
FIG. 7 is a simplified block diagram showing the clocking arrangement for the synchronous system of the present invention.

FIG. 7 is a simplified diagram showing the synchronous timing arrangement. The multiplexer/demultiplexer or C-MUX 144 is illustrated in FIG. 7 as connected by a lead 156 to an external timing clock 158. The C-MUX 144 is illustrated as having a multiplexer portion or side 160 and a demultiplexing portion or side 162 and it is understood that the A-MUXS and B-MUXs are similarly constructed to function as multiplexers and demultiplexers. The transmitted data is illustrated as sent out over channel 164 and at the same time clock pulses are sent out by way of channel 166 and through the microwave trunk to the remainder of the network to provide synchronous operation. The receiving side of the C-MUX receives data over the channels illustrated at 168 and receives clock information over channel 170. In the preferred embodiment separate channels are provided for the clock pulses but it is understood that if desired the clock pulses containing the timing information can be embedded in the data bit stream. All portions of the system are supplied with this same clock information for both the send and receive portion of the system and to this end along with the transmitted data over channel 172 the multiplexer sends clock pulses over a transmitting clock channel 174 to that portion of the system located on the low speed side of multiplexer 144 which passes through the B-MUXs and A-MUXs to the DCCs 112. Data from the DCCs along with clocking information is returned through the A-MUXs and B-MUXs to the C-MUX by way of the receive data channel 176 and the receive clock channel 178.

Figures 8, 9, 10:
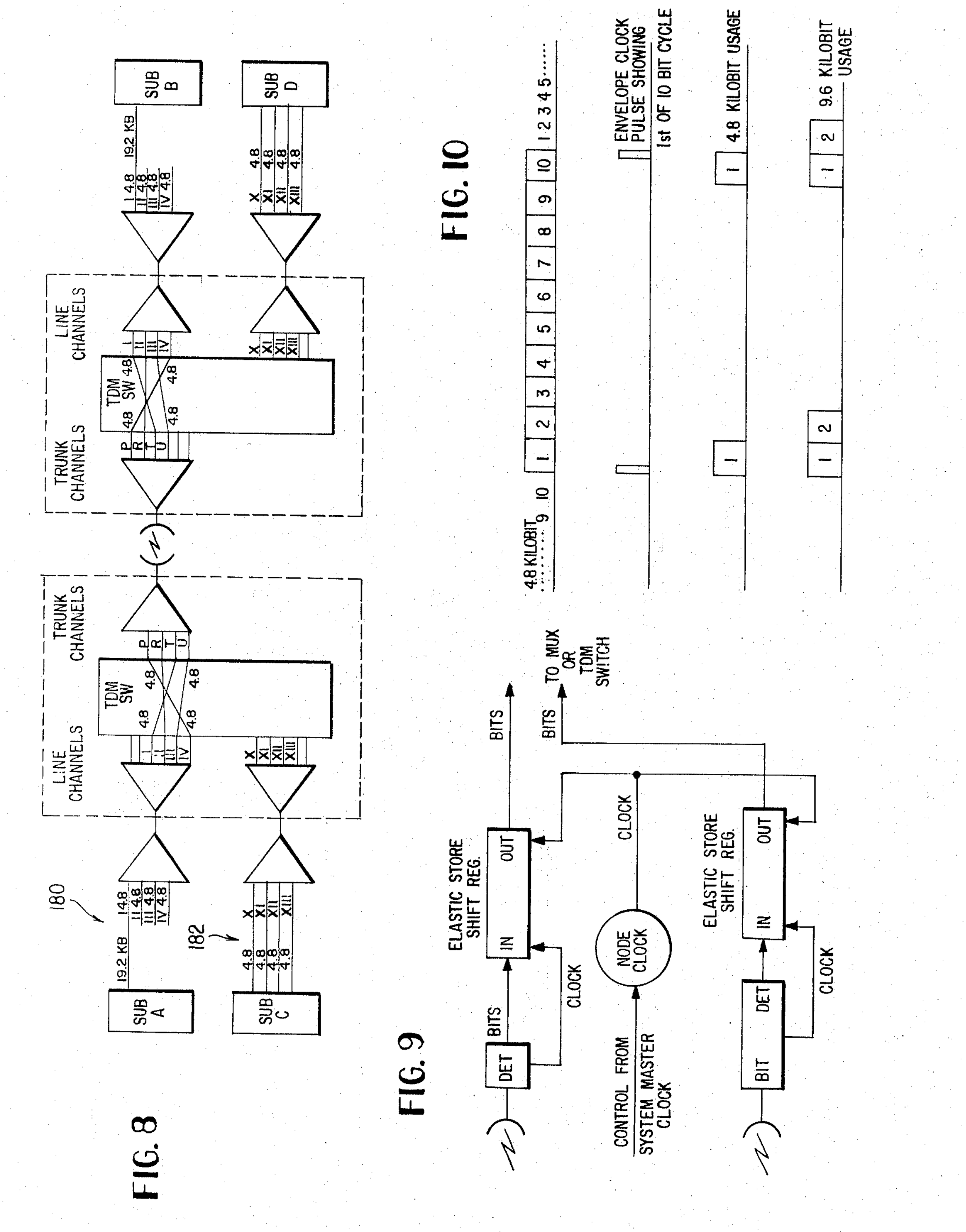
FIG. 8 is a simplified block diagram illustrating the use of multiple lower speed channels to obtain a higher speed channel in the system of the present invention.
FIG. 9 is a simplified block diagram illustrating an elastic store operation to give constant phase relationship in the synchronous system of the present invention.
FIG. 10 shows a series of waveforms illustrating possible customer speed selection.

FIGS. 8, 9, and 10 illustrate the flexibility of the synchronized system of the present invention. As previously indicated, the basic building block of the network of the present invention is 4.8 kilobit synchronous data channel. The time division switch matrix in turn consists of only 4.8 kilobit channels. However, when it is necessary to switch a higher bit rate than 4.8 kilobit this is accomplished by parallel (simultaneous) connections of more than one 4.8 kilobit channel. At the multiplexing equipment at the customer's end of the circuit the points are strapped as illustrated at 180 in FIG. 8 to achieve the data rate necessary. At the switch end there is no need to strap the points together since they are treated at 4.8 kilobit channels and are switched more or less randomly to trunks, the sequence of the trunk connections themselves not being important. It is only necessary that after having been switched through the terminating subscriber's end the sequence be the same as the originating subscriber's end. The strapped multiplex-ports at the terminating subscriber's end, i.e., subscriber B in FIG. 8 are retimed and sent to the subscriber in such a way that he sees a continuous stream (at a higher bit rate) of data bits.

It should be noted, however, that in locations such as a central time share computer where there are a multitude of subscriber channel terminations there is no need to have the ports strapped together for higher speed usage. The computer can literally make parallel connections dialing separately on each channel. Thus any integer multiple of 4.8 kilobits can be chosen by the computer by combining any available ports and this arrangememt is illustrated in FIG. 8 for subscriber C.

If both ends of a connection are individual 4.8 kilobit channels, the computer can make any decision it wishes as to the order that it will offer bits to the 4.8 channels and the computer at the other end can remove them in that same sequence as is illustrated in FIG. 8 for subscribers C and D. Since most computers are byte or word oriented, the number of channels necessary for a byte or a word can be called up at one time and parallel transfer takes place, as happens on many peripheral interface adaptors in third generation computers.

The important aspect of the foregoing is that this is being done in a synchronous network, thus all of the bits have to remain in their relative positions as long as the integrity of the network remains, i.e., there is no need for concern about phasing or overlapping bits.

It should be pointed out that there may be alternate geographic routes in larger common carrier configurations and the customer dialing up multiple parallel circuits cannot be assured that each channel has been accommodated on the same geographic path. Therefore, the variations in delay in sending and receiving can cause variations in phase positions of the bits. However, it is a simple matter to program a computer to analyze a synchronizing code sent over the parallel connections prior to the sending of data. This program can then determine the relative position of the parallel bits from the synchronizing code. Although there are various paths that parallel bits might take from one end of the country to another if they are in a synchronized digital network it is axiomatic that once they have arrived at a receiving point in an arbitrary phase relation they will not again shift their phase. Although they might not all arrive in the same bit clock position (they could be off by integer bit clock positions) due to various propogation delays, the elastic stores within the common carrier network keeps the relative integer bit position the same for the duration of that call. A typical elastic store configuration to give such constant phase relationship is illustrated in FIG. 9.

It also follows that time division multiplexing in a synchronous switch network allows customers to have speed of service under the customer's control at the time the call is initiated. For example, assume that the customer wants up to 48 kilobits service which would require 10 4.8 kilobits ports in the multiplex equipment. The user is given an indication through timing pulses at his 48 kilobit data rate where the first port appears, i.e., which of every ten pulses is the first port and therefore which is the second on to the tenth. Thus, when he wishes only 4.8 kilobit service he only uses one out of ten bit positions after he has indicated to the central office that he is making a 4.8 kilobit call or if he is making a 9.6 kilobit call he is told which two out of 10 bit positions he should use and so on. When a customer is receiving a call, it is possible to indicate to the receiving digital communications console (DCC) during the call setup procedure which speed the call is and from that it can be determined which of the 10 bits that constitute the 48 kilobit stream are to be used and which are to be ignored. FIG. 10 shows a possible customer speed selection in this arrangement.

Figure 11:
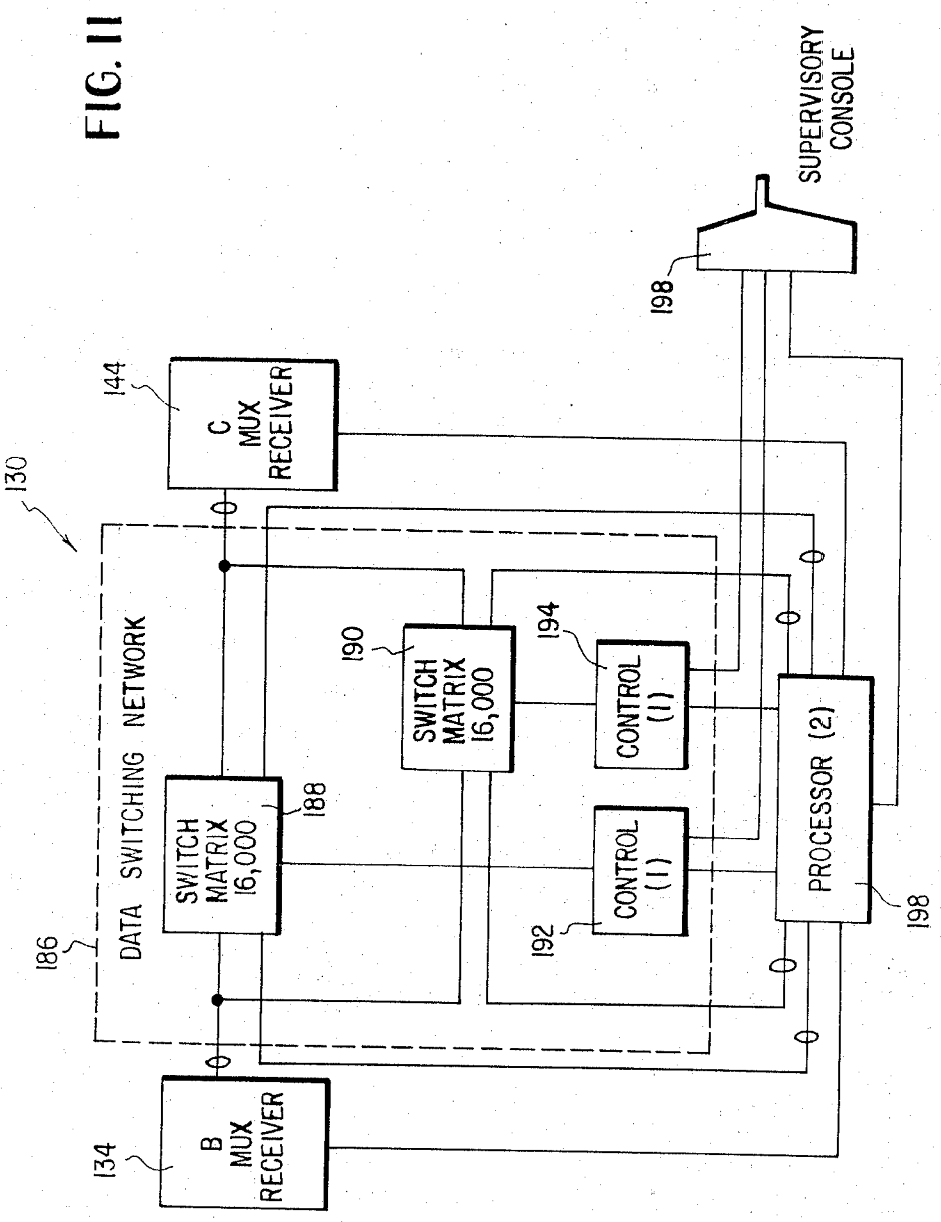
FIG. 11 is a simplified block diagram of a time division data switching network incorporated into the system of the present invention.

In addition to synchronous operations and time division multiplexing, the network of the present invention includes time division switching. A simplified block diagram of the time division switching (TDS) network 130 is illustrated in FIG. 11. That figure shows the receiving portion of the B-MUX 134 and the transmitting portion of the C-MUX 144 connected to opposite sides of the data switching network illustrated by the dash box 186. It consists of an overlay switch matrix 188 and an underlay switch matrix 190 each having separate and independent controls 192 and 194, respectively. These operate under the control of a processor (one for each control unit 192 and 194) 196 and a supervisoury console 198. The overlay and underlay switch matrixes 188 and 190 are provided with parallel access to and from the A-MUX and B-MUX and with access to the dual processors. A synchronizing clock is also provided to the switch system from the multiplex equipment. The overlay and underlay switches provide a switching system that has non-blocking capabilities; that is, the system is non-blocking if the number of time slots is equal to the sum of a number of inlets plus the number of outlets minus 1. This configuration also provides active standby redundancy which prevents a single component failure from causing a catastrophic failure in the system. If one of the matrixes is removed from service, the other will establish calls from any inlet to any outlet but with a degraded traffic handling capability.

In the switch matrix 188 streams of time slots are taken on one side of the switch and these time slots are "time slot switched" onto outgoing data streams in different orders. Virtually any time slot coming into the matrix can be put into any other time slot position going out of the matrix. The whole matrix handles only a low level computer-like "yes-no" or "mark-space" signals, and the whole action of the matrix is much the same as in a computer. The signals come into the switch in their multiplex form. The time slots arc switched and then they leave the switch in their multiplex form.

Figure 12:
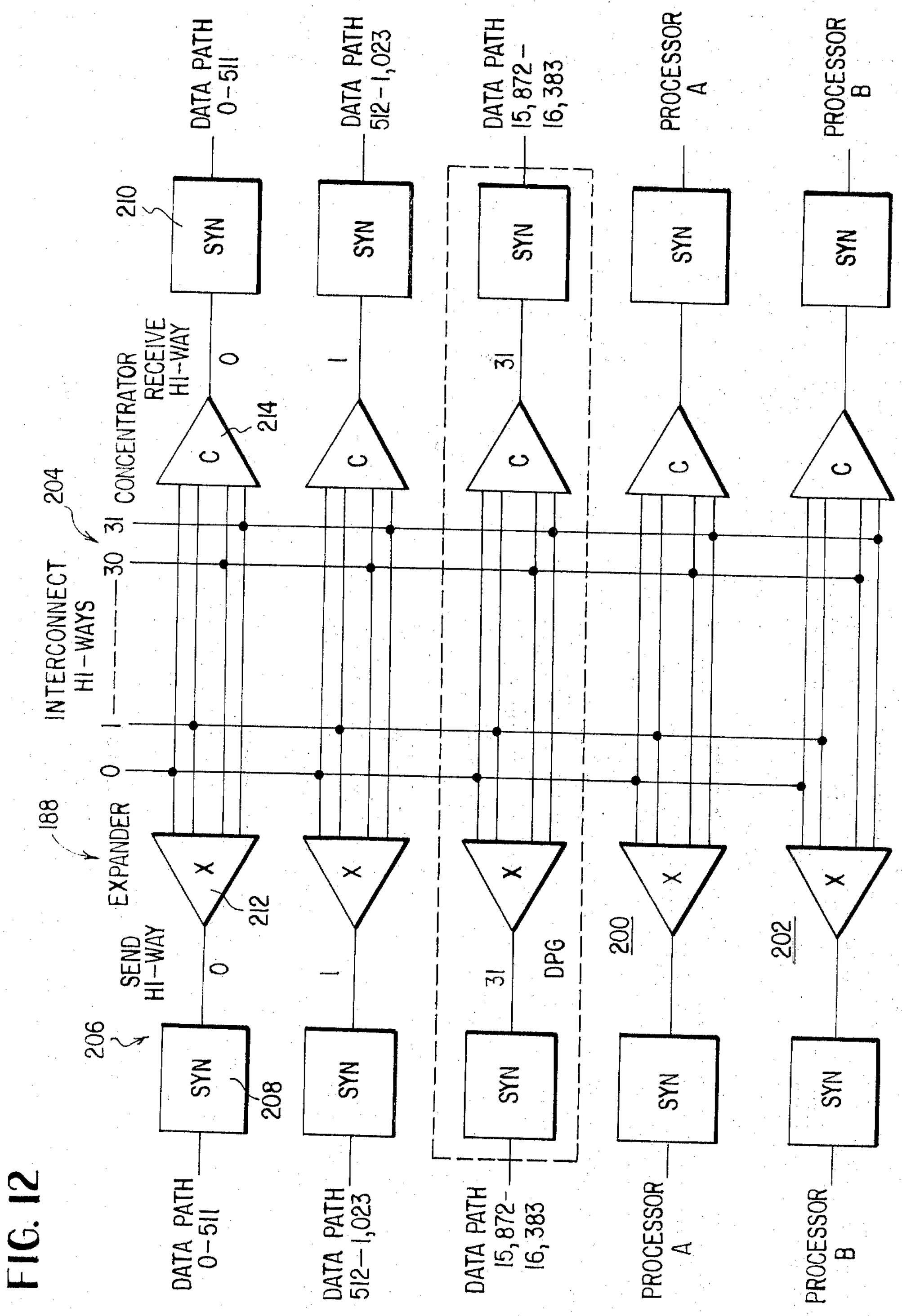
FIG. 12 is a simplified block diagram of a time division switch matrix incorporated in the system of the present invention.

FIG. 12 is a general block diagram of one of the switch matrixes, i.e. matrix 188, it being understood that the other switch matrix 190 is of identical construction. The switch matrix is composed of a maximum of 32 data path switch matrix group assemblies (DPG) as illustrated in FIG. 12 and each of these assemblies provides an in and an out appearance for 512 data paths each operating at a 4,800 bit per second rate. A district office uses two of the assemblies such as those illustrated at 200 and 202 to provide signaling and supervisory access to the dual processors. The 32 switching assemblies in the matrix are numbered 0 through 31 in FIG. 12 and are connected together by 32 conductors called interconnect highways illustrated at 204. Each interconnect highway is capable of carrying the data for 512 data paths at a 4,800 bit per second data rate per data path. The 32 assemblies provide 16,384 data paths through the switch matrix as the two matrixes 188 and 190 provide together twice that capability and thereby achieve the needed requirements to provide non-blocking operations.

The data path switch matrix group assembly (DPG) such as that illustrated at 206 forms the basic building block for the switch matrix and each DPG is comprised of five units, namely, a pair of synchronizers 208 and 210, an expander 212, and a concentrator 214. The 32 interconnect highways are illustrated at 204. As previously stated, each DPG 206 provides in and out appearances for 512 data paths.

Figure 13:
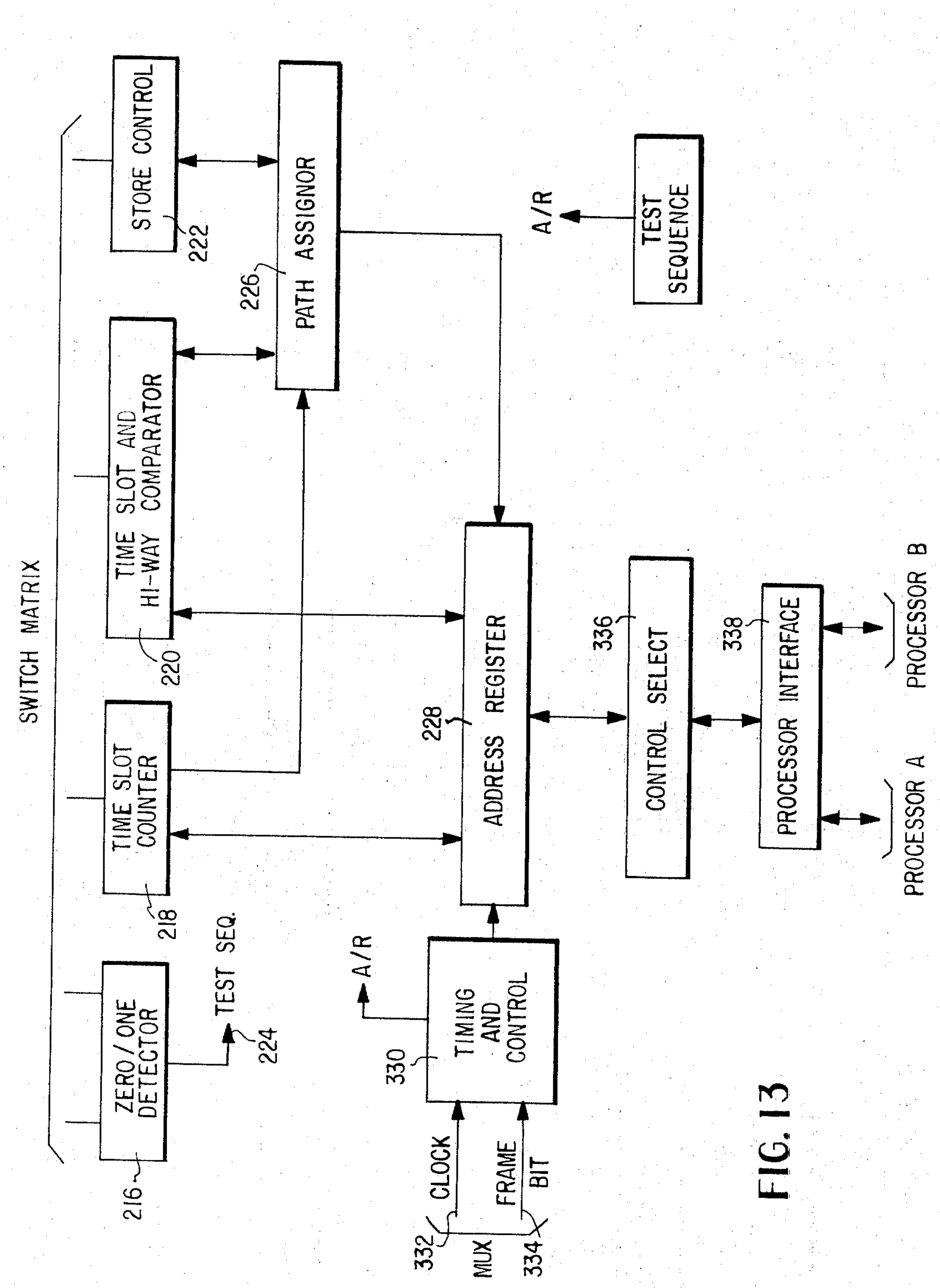
FIG. 13 is a simplified block diagram illustrating the time division switch control circuitry.

FIG. 13 is a simplified block diagram of the control system for the switch matrix 188. It comprises a 0/1 detector 216, a time slot counter 218, a time slot and highway comparator 220 and a store control 222. The 0/1 detector 216 is connected to a test output 224 and acts as a return for and a double check on the time slot counter. The time slot counter, time slot and highway comparator and store control are connected to a path assignor 226 which is in turn coupled to an address register 228. The address register receives a signal from the timing and control circuit 330 under the control of clock and subclock inputs 332 and 334 from the C-MUX. Address register 228 is coupled through a control selector 336 which selects either processor A or processor B and through an impedance transformer or processor interface 338 to the appropriate processor.

In FIG. 12 each data path has an appearance on the left side on the drawing and out from the right side of the drawing so that "in" many call any "out" via the appropriate appearances. The circuitry as shown thus provides one-way paths (left to right) and, therefore, requires that two paths through the switch matrix be established to complete a connection between two data paths appearing on the switch matrix. There are 512 data paths on the left at each synchronizer 208 all on one wire. Each data path is sampled every 208.3 microseconds for a 0.4069 microsecond interval. As it is sampled a "1" or a "0" is stored in the associated memory position within the synchronizer. Similarly, the synchronizer 210 on the right side in FIG. 12 will transmit a "1" or a "0" from its memory for each of its associated 512 data paths each 0.4069 microseconds of a 208.3 microsecond period. The data stored (or not stored) in the receive synchronizer 208 is gated onto the send highway in the assigned time slot (TS).

Figure 14:
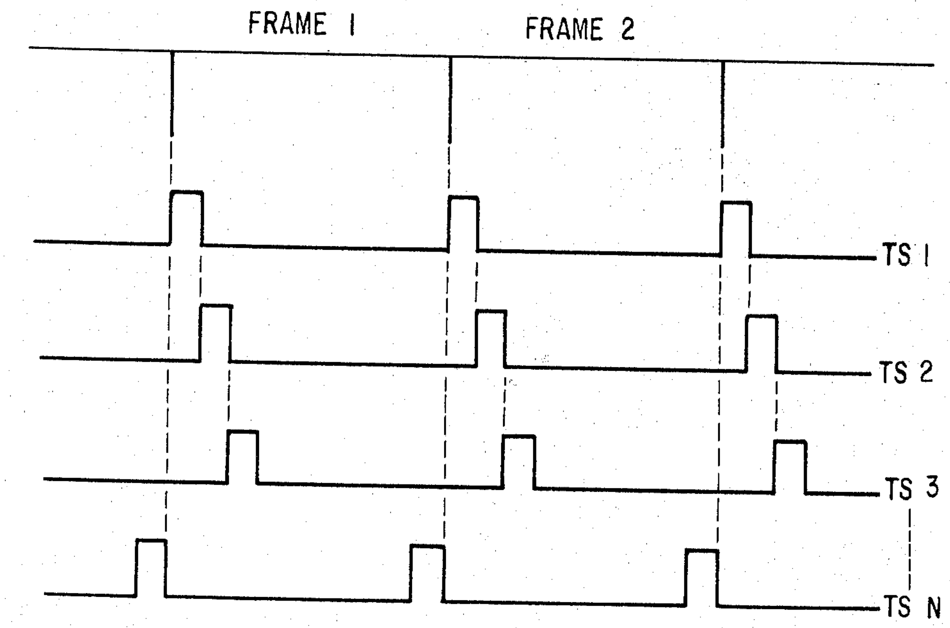
FIG. 14 shows a series of waveforms illustrating time division switching matrix synchronization in the present invention.

A long time interval (frame) is divided into many shorter time intervals (time slots). FIG. 14 shows the time sequence of the repetitive frames and the location of the time slots within the frame. As shown TS-1 only occurs once in each frame as does TS-2 and TS-3, etc. and as can be seen, no two (or more) time slots ever occur at the same time. The number of time slots to the frame is completely variable and is based strictly on requirements. The data on the send highway is gated through the selected expander 212 onto the desired interconnect highway 204 and through the selected concentrator 214 onto the receive highway and into the memory of the send synchronizer 210. This transfer from the receive synchronizer 208 to the send synchronizer 210 can be accomplished on each interconnect highway and from all synchronizers 208 simultaneously in any or all 512 time slots.

Figure 15:
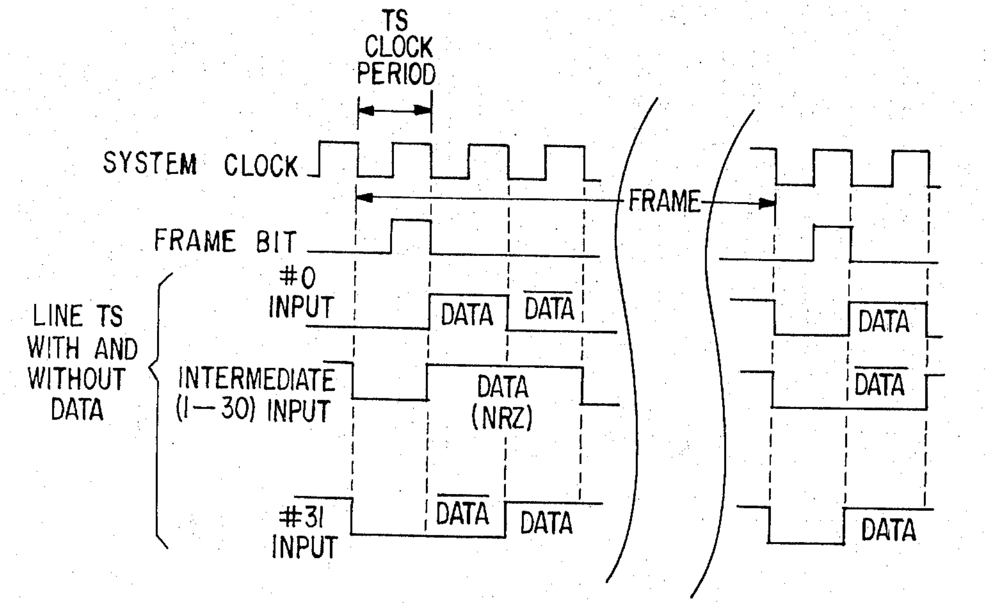
FIG. 15 is a pulse waveform diagram illustrating the time division switching matrix internal timing sequence in the system of the present invention.

FIG. 15 shows the synchronization between the clock, the frame bits and the various time slots. The system clock, frame bit and each of the 32 data inputs to the 32 DPGs 206 are provided to switch both frequency and phase synchronized as illustrated in that figure.

Figures 16, 17:
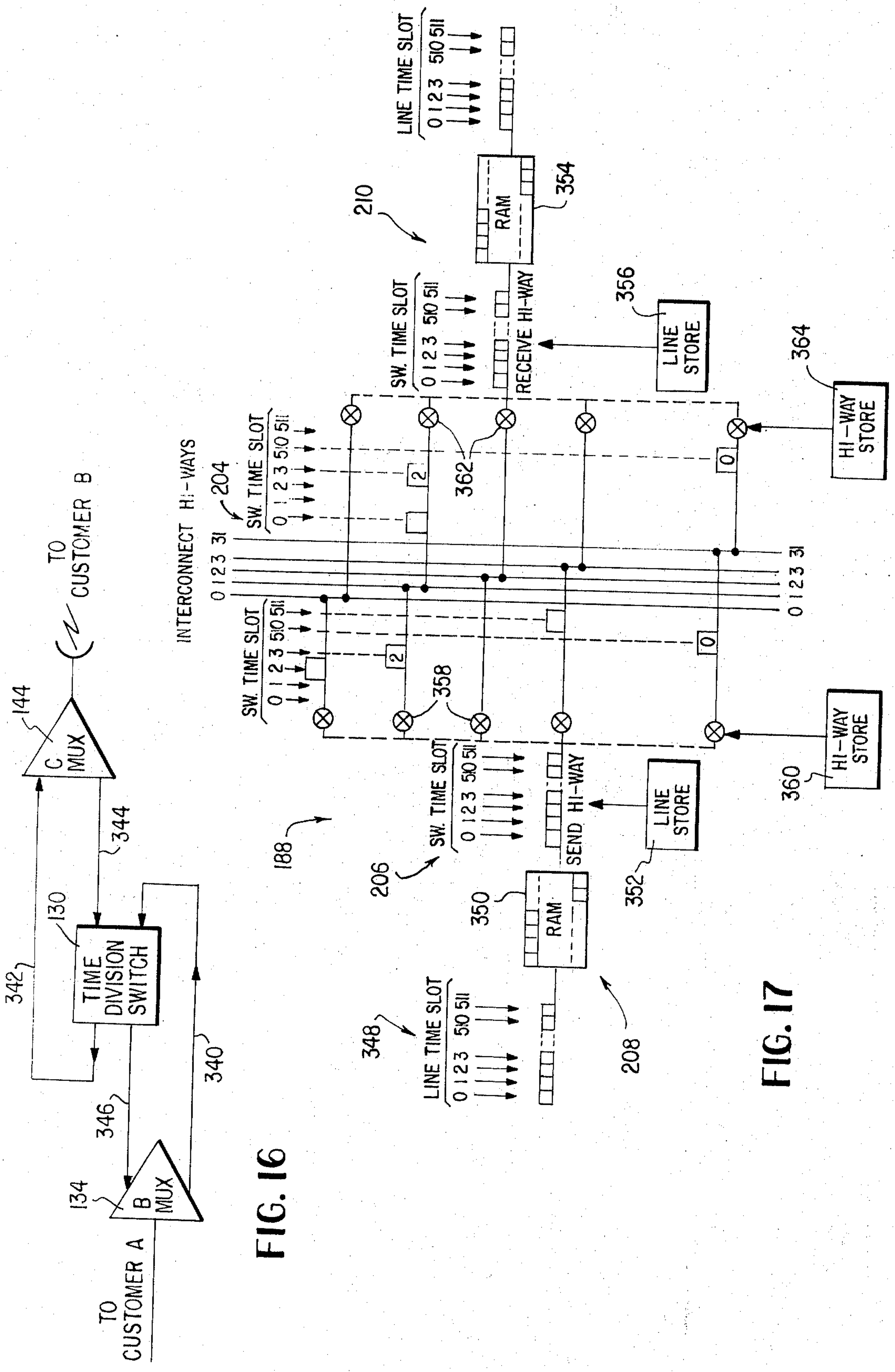
FIG. 16 shows a modified switching arrangement for the system of the present invention incorporating a full duplex time division switch and FIG. 17 is a detailed block diagram illustrating duplex connections through the time division switch matrix of the switch of FIG. 16.

While switches have been illustrated at both ends of the trunk line, it is possible to accomplish time division switching at only one end of the line with a single switch network and the manner of doing that is illustrated in FIG. 16. In that figure, the time division switch 130 is connected for full duplex operation between the B-MUX and C-MUX 134 and 144, respectively, to provide single switch type full duplex switching at one end of the line. Signals going from a customer in FIG. 16 pass through B-MUX 134 and by way of a lead 340 where they make a "in" appearance on the switch 130. The "out" appearance is on lead 342 over which the signal passes on through C-MUX 144 to a customer B. Similarly, signals from customer B pass through C-MUX 144 and lead 344 where they pass through the time division switch 130 onto lead 346 and pass through B-MUX 134 to customer A to provide simultaneous two-way or full duplex communication operation. The switch matrix 188 may be used to provide a one-way or simplex switching or through the use of two connections may be used for full duplex operation.

FIG. 17 is a more detailed disclosure of the switch matrix 188 and will be described in conjunction with full duplex switching connections through the switch. FIG. 17 shows a single DPG 206 with the 512 data paths identified as the line time slots 0 through 511 at 348. The synchronizer 208 is comprised of a random access memory (RAM) 350 and a line store 356. The expander consists of the send highway to interconnect highway gates 358 along with the highway store 360 and the concentrator 214 consists of a interconnect highway to receive highway gates 362 and the highway store 364.

In FIG. 17 there is shown 512 data paths appearing on the left (into ram 350) and on the right (out of ram 350) in their associated line time slot with one frame sequence being shown on each side. Maintaining the binary configuration the 512 time slots are numbered 0 through 511. The ram 350 has a memory bit position associated with each time slot. In each frame the status (1 or 0) of the data path is stored in the ram in the associated memory bit. Thus, the status of data path 0 (line TS 0) is stored in memory bit position 0 and data path 500 (line TS 500) is stored in memory bit position 500 in the random access memory (ram) 350.

The switching time slot for the send highway, receive highway and interconnect highway is used in the send highway and receive highway line stores 352 and 356 and in the interconnect highway stores 360 and 364. This switching time slot is used to transfer the status of a memory bit position in the send ram 350 to the appropriate memory position in the receive ram 354. The line store 352 has stored the ram memory bit position in the switching time slot and the two highway stores 360 and 364 both have stored the assigned interconnect highway identity in the switching time slot and the receive highway line store 356 has stored the appropriate memory bit position of the receive ram 354 in the switching time slot. Each ram is divided into two sections that are addressed in an alternate frame sequence to allow an alternating read/write cycle. The cycle is equivalent to two frames. During the first frame time of the cycle one section is enabled for a write-in condition and the other section is enabled for a read-out condition. During the second frame of the cycle the enabled condition of the two sections are reversed. The send highway line store 352 samples the status of the memory bit position in the send ram 350 and applies it to the gates 358. The send highway store 360 enables the gate associated with the assigned interconnect highway 204 and allows the memory bit position status to be gated onto the assigned interconnect highway and applied to all gates 362. The receive highway store 364 enables the gate 362 associated with the interconnect highway chosen and allows the memory bit position status to be gated onto the proper receive highway and applied to the input of the receive ram 354. The receive highway line store 356 enables the proper memory bit position in the receive ram 354 and stores the status being applied to the input of that ram. Thus, during the interval of the switching time slot, the status of a memory bit position within the send ram 350 is transferred and copied into the receive ram 354 in a new memory bit position.

FIG. 17 shows a connection established between data paths 0 and 2. The duplex connection between these consists of the status of the (0) memory position in send ram 350 being sent to the number 2 memory bit position in receive ram 354 using switching time slot 510 and interconnect highway 31. In addition, the status of the number 2 memory position in send ram 350 is sent to the 0 memory position in ram 354 by way of switching time slot 3 and interconnect highway 1. Other connections are also shown in FIG. 17 in and out of DPG 206. Switching time slots 2 and 511 on the send highway show connections to other DPGs by way of interconnect highways 0 and 3. Referring to FIG. 16, 0–2 send to receive ram interconnections may represent the connection from lead 340 to lead 342 in FIG. 16, and the 2–0 send to receive ram connection may represent the switch connection from lead 344 to lead 346 in FIG. 16 to provide a parallel or full duplex connection through the switch.

It is apparent from the above that the present invention provides an improved common carrier network for the high speed transmission of digital data. The system of the present invention is of the same general type as that disclosed in copending Application Ser. No. 88,068 of Nov. 9, 1970 for DATA TRANSMISSION NETWORK and in addition to time division multiplexing incorporates synchronous data transmission and time division switching. This makes possible a simpler and less expensive construction while at the same time preserving the high speed and reliability of that system. Important features of the invention in addition to the synchronous operation and the time division switching involve the provision of a multiplexer hierarchy with flexibility of customer operation and permitting a wide variety of transmission services to suit customer needs. This multiplexer hierarchy is fully compatible with synchronous transmission wherein all parts of the system are synchronous or at least semi-synchronous and time division rather than space division call switching is employed.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed and desired to be secured by United States Letters Patent is:

1. A data transmission network comprising a plurality of data input channels and a plurality of data output channels, a time division switch coupled between said input and output channels for selectively interconnecting different ones of said input and output channels, a multiplexer having a low speed side and a high speed side coupled to said input channels for time division multiplexing said input channels into corresponding transmission channels, clock means coupled to said channels for synchronizing said channels, a microwave backbone trunk comprising a microwave transmitter coupled to said multiplexer, said transmitter including means for digitally modulating a microwave carrier in accordance with the output of said multiplexer, a receiver including means for demodulating said carrier, a series of microwave repeater stations coupling said transmitter to said receiver, and a demultiplexer coupling the output of said receiver to said output channels.

2. A transmission network according to claim 1 wherein said multiplexer, demultiplexer, transmitter and receiver are repeated to provide two-way full duplex transmission through said repeater stations.

3. A transmission network according to claim 1 wherein said output channels are coupled to a local distribution transmission system.

4. A transmission network according to claim 3 including a plurality of digital communications consoles coupled to said local distribution system.

5. A transmission network according to claim 1 wherein said clock means comprises an external clock coupled to said multiplexer, at least one clock channel coupled to the high speed side of said multiplexer, and at least one clock channel coupled to the low speed side of said multiplexer.

6. A transmission network according to claim 1 including a plurality of multiplexers forming a multiplexer hierarchy coupled between said input channels and said transmitter, the multiplexed output of each successive multiplexer in said hierarchy being at a higher rate.

7. A transmission network according to claim 6 including means for coupling said multiplexer hierarchy to said time division switch.

8. A transmission network according to claim 7 wherein said hierarchy is formed by multiplexers having three different output rates.

9. A data transmission network comprising first and second groups of digital communications consoles for use by subscribers, a first local distribution system coupled to said first group, a second local distribution system coupled to said second group, a first transmitter and receiver, a first multiplexer-demultiplexer hierarchy coupling said first local distribution system to said first transmitter and receiver, a first time division switch matrix for switching time slots between its input and output coupled to said first multiplexer-demultiplexer hierarchy, a second transmitter and receiver, a series of microwave repeaters coupling said first and second transmitters and receivers, a second multiplexer-demultiplexer hierarchy coupling said second transmitter and receiver to said second local distribtuion system, and a second time division switch matrix coupled to said second multiplexer-demultiplexer hierarchy.

10. A transmission network according to claim 9 wherein said first transmitter and second receiver operate at a different carrier frequency from the carrier frequency of said second transmitter and first receiver.

11. A transmission network according to claim 9 wherein each of said microwave repeaters comprises a first microwave antenna for both sending and receiving in a first direction and a second microwave antenna for both sending and receiving in a second direction.

12. A transmission network according to claim 11 wherein each of said repeaters includes third and fourth microwave antennas for space diversity reception.

13. A transmission network according to claim 12 wherein each of said repeaters includes a microwave tower, said third antenna being mounted on said tower beneath said first antenna, and said fourth antenna being mounted on said tower beneath said second antenna.

14. A transmission network according to claim 9 wherein a plurality of the low speed ports of said first multiplexer-demultiplexer hierarchy are strapped together for higher speed customer service and a corresponding plurality of the low speed ports of said second multiplexer hierarchy are similarly strapped together.

15. A transmission network according to claim 9 including a pair of receivers coupled to at least one of said multiplexer-demultiplexer hierarchys, and an elastic store circuit coupling said pair of receivers to said one hierarchy.

16. A transmission network according to claim 15 wherein said elastic store circuit comprises an elastic store shift register coupled between each of said receivers and said one hierarchy.

17. A transmission network according to claim 9 wherein a plurality of the low speed ports of said first multiplexer-demultiplexer hierarchy are coupled in parallel to one of the digital communications consoles of said first group and a corresponding plurality of the low speed ports of said second multiplexer-demultiplexer hierarchy are coupled in parallel to one of the digital communications consoles of said second group.

18. A data transmission network comprising a digital backbone trunk of microwave repeaters forming a string of microwave communication links extending substantially across the continental United States, a plurality of switching stations coupled to said trunk and controlling the flow of communication traffic through said trunk, each of said stations including a time division switch matrix for switching time slots between its input and its output, a combination multiplexer-demultiplexer coupled to said backbone trunk at each of said stations, a local distribution system coupled to said multiplexer-demultiplexer at each of said stations, and a plurality of subscriber digital communications consoles coupled to said local distribution system at each of said stations.

19. A transmission network according to claim 18 wherein each said switch matrix includes first means for establishing switched communications paths through said backbone trunk and second means for establishing switched communications paths through its respective local distribution system.

20. A transmission network according to claim 18 wherein said combination multiplexer-demultiplexer comprises a first A-MUX level having a first multiplexing rate, a second B-MUX level having a second multiplexing rate and a third C-MUX level having a third multiplexing rate.

21. A transmission network according to claim 20 wherein the rate of said B-MUX level is greater than said A-MUX level, and the rate of said C-MUX level is greater than said B-MUX level.

22. A transmission network according to claim 21 in which the low speed side of said A-MUX level is coupled to said local distribution system and the high speed side of said C-MUX level is coupled to said backbone trunk.

23. A transmission network according to claim 22 in which said switch matrix is coupled between said B-MUX level and said C-MUX level of said combination multiplexer-demultiplexer.

24. A transmission network according to claim 18 wherein said switch matrix comprises an input memory and an output memory, and means coupling said memories for transferring the state of a memory location in said input memory to a different memory location in said output memory.

25. A transmission network according to claim 24 wherein said switch matrix comprises a plurality of interconnect highways for coupling said input and output memories.

26. A transmission network according to claim 25 wherein said memories are both random access memories.

27. A transmission network according to claim 25 including an input line store and an input highway store for coupling said input memory to said interconnect highway.

28. A transmission network according to claim 27 including an output highway store and an output line store for coupling said interconnect highways to said output memory.

29. A transmission network accordng to claim 25 comprising 512 interconnect highways between said input memory and said output memory.

* * * * *

PO-1050
(5/69)

UNITED STATES PATENT OFFICE
CERTIFICATE OF CORRECTION

Patent No. 3,823,401 Dated July 9, 1974

Inventor(s) Edward A. Berg, Charles R. Fisher and Frank T. Chen

It is certified that error appears in the above-identified patent and that said Letters Patent are hereby corrected as shown below:

On page 1, the inventors should read:

--Edward A. Berg, Vienna; Charles R. Fisher, Falls Church; Frank T. Chen, Merryfield Village, all of Va.--

Col. 2, line 2-3, "comprehesive" should read --comprehensive--.
Col. 5, line 28, "digital and" should read --digital data--.
Col. 7, line 64, "manner is" should read --manner in--.
Col. 9, line 25, "highly" should read --high--.
Col. 12, line 55, "building" should read --billing--.
Col. 14, line 30, "carried" should read --carrier--.
Col. 15, line 29, "sevice" should read --service--.
Col. 16, line 34, "addresses" should read --addressees--.
Col. 19, line 30, "at" should read --as--.
Col. 21, line 15, "arc" should read --are--.
Col. 21, line 26, "rate" should read --data rate--.

Signed and sealed this 19th day of November 1974.

(SEAL)
Attest:

McCOY M. GIBSON JR.
Attesting Officer

C. MARSHALL DANN
Commissioner of Patents